(12) United States Patent
Reffitt

(10) Patent No.: US 7,422,082 B2
(45) Date of Patent: Sep. 9, 2008

(54) SMALL-SIZED VEHICLE

(75) Inventor: David Reffitt, Newnan, GA (US)

(73) Assignee: Yamaha Motor Mfg. Corp. of America, Newnan, GA (US)

( * ) Notice: Subject to any disclaimer, the term of this patent is extended or adjusted under 35 U.S.C. 154(b) by 529 days.

(21) Appl. No.: 11/118,563

(22) Filed: Apr. 29, 2005

(65) Prior Publication Data

US 2006/0254835 A1 Nov. 16, 2006

(51) Int. Cl.
B62D 25/06 (2006.01)
(52) U.S. Cl. ............. 180/90.6; 280/DIG. 5; 296/193.07
(58) Field of Classification Search ............ 296/193.07, 296/204, 37.14, 192, 203.02, 77.1; 180/89.1, 180/89.11, 90.6, 908; 280/DIG. 5
See application file for complete search history.

(56) References Cited

U.S. PATENT DOCUMENTS

| 2,964,331 | A | * | 12/1960 | Sherman ..................... 280/790 |
| 4,930,591 | A | * | 6/1990 | Lanius et al. ............... 180/65.1 |
| 5,238,267 | A | * | 8/1993 | Hutchison et al. ............ 280/781 |
| 5,984,356 | A | * | 11/1999 | Uphaus ....................... 280/781 |
| 6,699,616 | B2 | * | 3/2004 | Wu .............................. 429/98 |
| 7,258,395 | B2 | * | 8/2007 | Bataille et al. .......... 296/203.01 |
| 2006/0180383 | A1 | * | 8/2006 | Bataille et al. ............... 180/311 |

FOREIGN PATENT DOCUMENTS

| JP | 2-189286 | * | 7/1990 | .................. 296/204 |
| JP | 2-189288 | * | 7/1990 | ............ 296/203.01 |

* cited by examiner

Primary Examiner—Christopher Ellis
Assistant Examiner—Joseph Rocca
(74) Attorney, Agent, or Firm—Keating & Bennett, LLP

(57) ABSTRACT

A small-sized vehicle has a structure that enables reductions in the number of assembly steps and that improves the sealing property of a connecting portion without causing a cost increase. The small-sized vehicle includes a floor panel having a foot panel portion on which an occupant places his/her feet and a front panel portion arranged to extend upwardly between a suspension system and the legs of the occupant, the foot panel portion and the front panel portion being integrally formed of resin, and the floor panel made of resin is arranged and fixed on a vehicle body frame.

6 Claims, 21 Drawing Sheets

SMALL-SIZED VEHICLE

BACKGROUND OF THE INVENTION

1. Field of the Invention

The present invention relates to a small-sized vehicle such as a passenger golf car, for example.

2. Description of the Related Art

Generally, the vehicle body front portion of a golf car includes a front suspension system supporting left and right front wheels on a vehicle body frame in a vertically swingable manner, a steering system for steering the left and right front wheels to the left and right, a seat disposed on a middle portion of the vehicle body frame, and a floor panel disposed in front of and lower than the seat.

The floor panel has a floor portion on which the feet of an occupant are placed and a front portion extending upwardly from a front edge of the floor portion. The floor portion and front portion protect the area around the legs of the occupant from stones and splashing mud kicked up from the front wheels, and also prevents the occupant's feet from coming into contact with the suspension system and the steering system when they extend forward.

Meanwhile, the floor portion and the front portion are generally formed as individual parts. This causes problems such as increasing the number of assembly steps for assembling the floor portion and the front portion to the vehicle body frame and increasing costs due to a need to reinforce the sealing property of a connecting portion between the floor portion and the front portion.

Here, it is conceivable that the number of assembly steps is decreased and the sealing property of the connecting portion is enhanced by making the floor portion and the front portion from steel plates, respectively, and integrating them by welding. However, in this case, the cost increases due to the need for the welding step. Incidentally, when the floor portion and the front portion are integrally press-formed, a large mold is required, which also increases the cost.

SUMMARY OF THE INVENTION

In order to overcome the problems described above, preferred embodiments of the present invention provide a small-sized vehicle capable of reducing the number of assembly steps and enhancing the sealing property of the connecting portion without causing an increase in cost.

According to a preferred embodiment of the present invention, a small-sized vehicle includes a vehicle body frame, a suspension system supporting front wheels arranged at left and right sides of a front portion of the vehicle body frame on the vehicle body frame, a steering system for steering the front wheels to the left and right, a seat unit mounted on the vehicle body frame, and a floor panel arranged on the vehicle body frame, in which the floor panel includes a foot panel portion on which an occupant sitting on the seat unit places his/her feet and a front panel portion arranged to extend between the suspension system and the legs of the occupant, the foot panel portion and the front panel portion being defined by a single unitary integral resin member, and the resin floor panel made is arranged and fixed on the vehicle body frame.

In the present preferred embodiment, since the foot panel portion and the front panel portion are defined by a single unitary integral resin member by forming a single resin member including the foot panel portion and the front panel portion, and since this single unitary resin member is arranged and mounted on the vehicle body frame, the number of assembly steps can be reduced as compared to the case in which the foot panel portion and the front panel portion are individually formed and independently assembled on the vehicle body frame. Further, the present preferred embodiment does not cause a problem such as a deficient sealing condition of a connecting portion between the foot panel portion and the front panel portion, and furthermore, the present preferred embodiment does not cause a problem such as a cost increase which occurs when the foot panel portion and the front panel portion are integrated by welding.

According to one preferred embodiment of the present invention, a recess portion recessing downward is disposed in the foot panel portion, and in the recess portion, pedal support portions rotatably supporting an arm lower end portion of an accelerator pedal and an arm lower end portion of a brake pedal are arranged and accommodated.

In this preferred embodiment, since the pedal support portions are accommodated in the recess portion of the foot panel portion, the pedal support portion does not interfere with the feet of an occupant when the occupant's feet press down on the pedal.

According to still another preferred embodiment of the present invention, there is further provided a lid member arranged to cover an upper end opening of the recess portion in an attachable/detachable manner, and in the lid member, cut-outs through which the accelerator pedal arm and the brake pedal arm are inserted are provided.

In this preferred embodiment, since the upper end opening of the recess portion is covered by the lid member, the pedal support portions can be covered and hidden by the lid member, so that the interference of the feet of an occupant with the pedal support portion can be surely prevented, and also the deterioration in appearance can be prevented. Further, by simply removing the lid member, maintenance of the pedal support portions can be easily performed.

According to still another preferred embodiment of the present invention, there is further included an item placement panel portion that is integral with the rear edge of the foot panel portion, and the item placement panel portion is located below the seat unit.

In this preferred embodiment, since the item placement portion that is integral with the foot panel portion is arranged below the seat unit, a vacant space under the seat can be effectively utilized to store items. Further, since the item placement portion is integral with the foot panel portion, increases in cost can be prevented as compared to the case in which the item placement portion and the foot panel portion are formed separately and defined by independent bodies.

According to still another preferred embodiment of the present invention, the item placement panel portion is designated as a battery mounting portion for mounting batteries, and in the battery mounting portion, a weep hole opening downward and a guide trench having a depth that inclines downward to the weep hole are provided.

In this preferred embodiment, the vacant space under the seat can be effectively utilized to accommodate and arrange batteries. Further, in the battery mounting portion, the weep hole opening downward and the guide trench inclining toward the weep hole are provided, so that liquid flowing into the battery mounting portion passes the guide trench and discharged outside through the weep hole. Thus, in case a battery liquid is spilt when the battery liquid is refilled or washing water enters, such liquid or water does not remain inside.

According to still another preferred embodiment of the present invention, on an under surface of the foot panel portion of the floor panel, positioning portions engaging with frame members extending in a forward and backward direction of the vehicle body frame to restrict a position of the floor panel in the vehicle width direction are integrally formed.

In this preferred embodiment, since the position of the floor panel in the vehicle width direction is restricted by engaging projecting portions of the foot panel with the frame members, positioning for assembling the floor panel with the vehicle body frame can be easily performed, and the precision of assembly of the floor panel with respect to the vehicle body frame can be increased.

According to still another preferred embodiment of the present invention, a cut-out or opening through which a steering column is inserted is provided in the front panel portion.

In this preferred embodiment, a process of assembling the steering column can be easily performed via the cut-out or opening of the front panel portion.

According to still another preferred embodiment of the present invention, a dashboard is arranged and connected to an upper portion of the front panel portion.

In this preferred embodiment, since the dashboard is connected to the upper portion of the front panel portion, the precision of assembly of the dashboard with the front panel portion is significantly increased. More specifically, in the dashboard, generally an article housing portion, an operation switch, and other suitable elements are arranged, so that an occupant sitting on the seat can easily see them. Therefore, the increase of the precision of assembly of these components is effective for improving the appearance thereof.

The operation and effect, and the features, elements, characteristics and advantages of the present invention will be described in detail with respect to the preferred embodiments thereof based on the attached drawings described below.

DETAILED DESCRIPTION OF THE PREFERRED EMBODIMENTS

Figure 1:
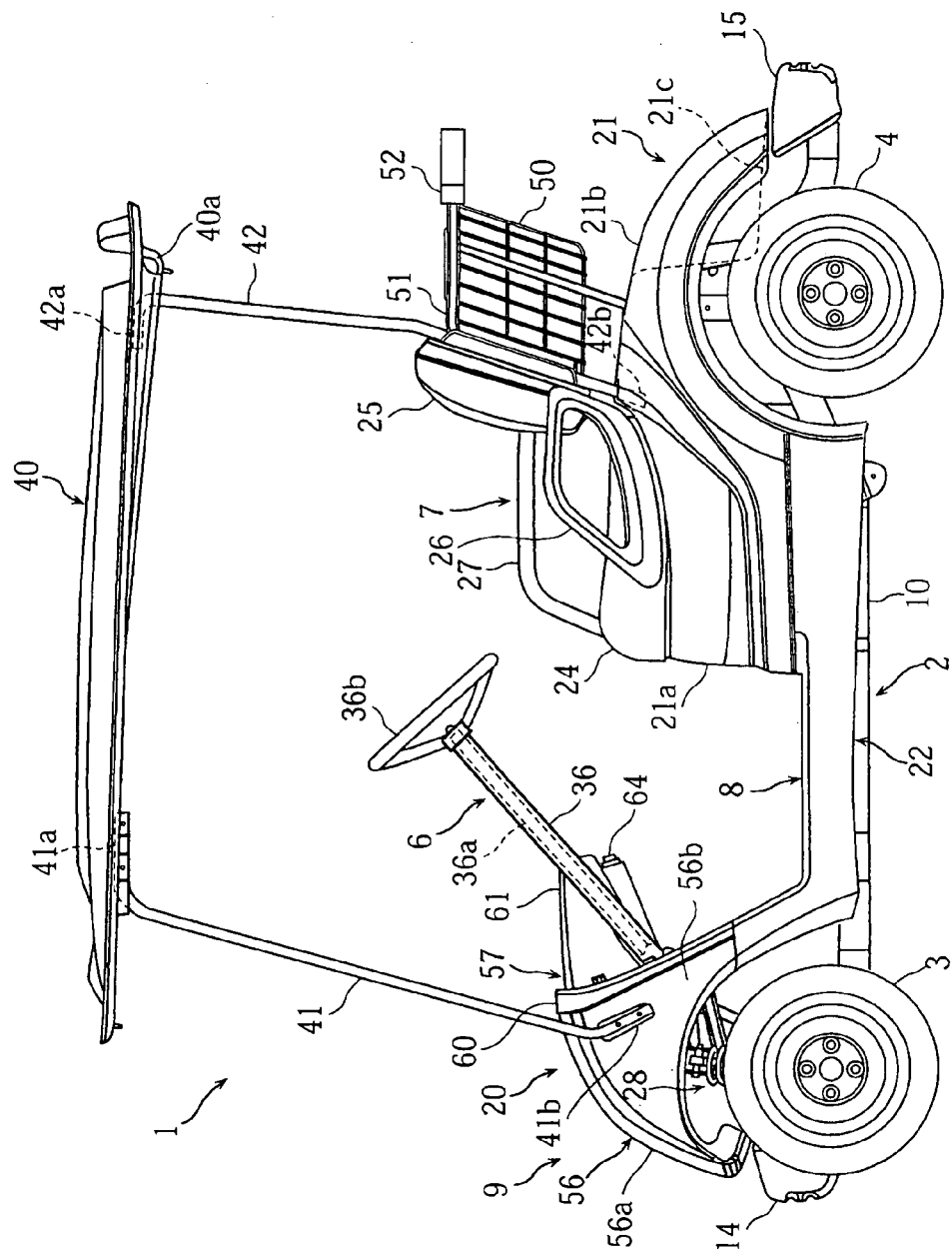
FIG. 1 is a left side view of a passenger golf car (small-sized vehicle) according to a preferred embodiment of the present invention.
Figure 2:
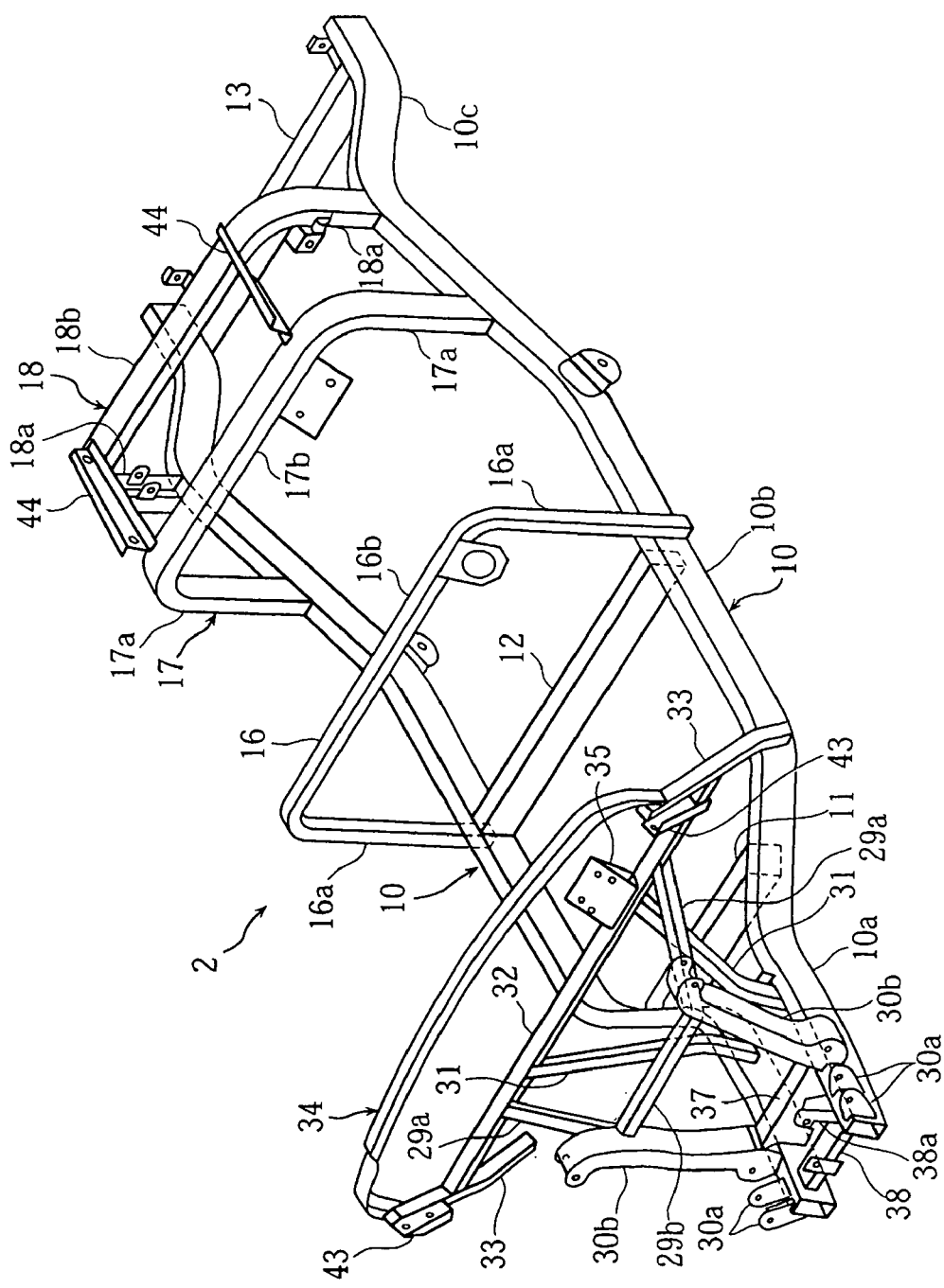
FIG. 2 is a perspective view of a vehicle body frame of the golf car.
Figure 3:
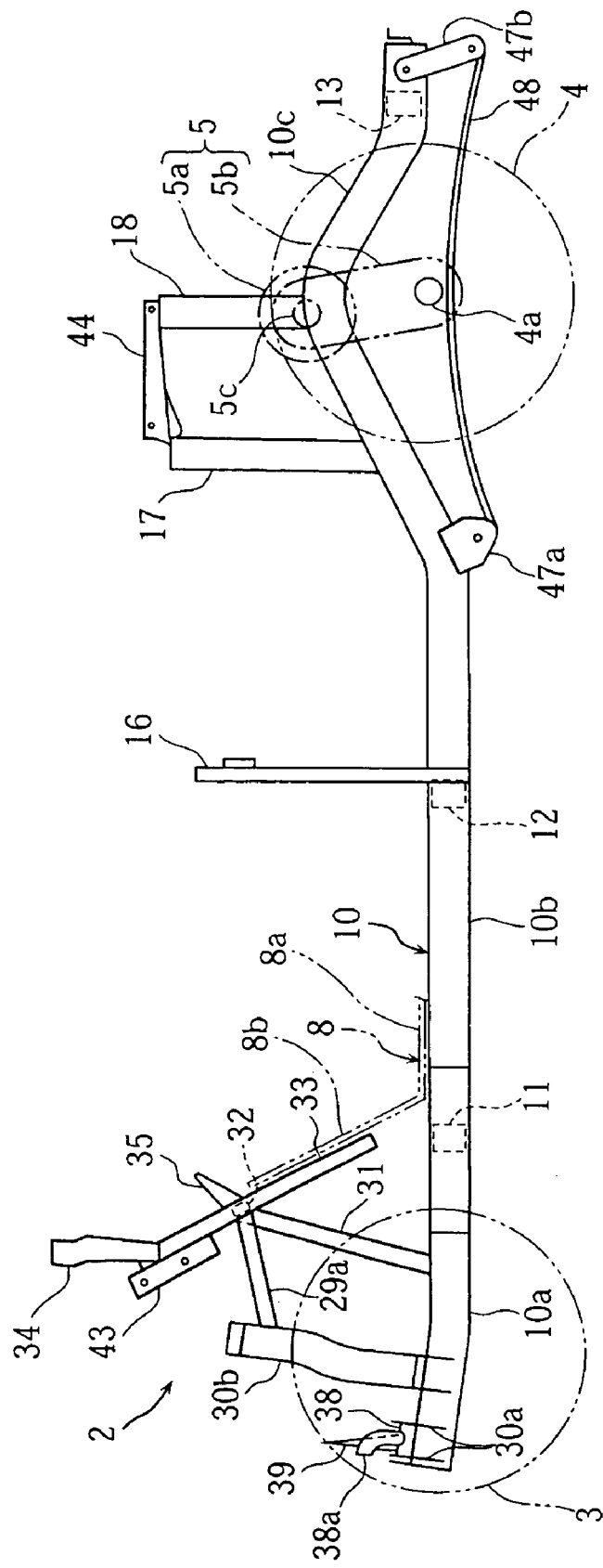
FIG. 3 is a left side view of the vehicle body frame.
Figure 4:
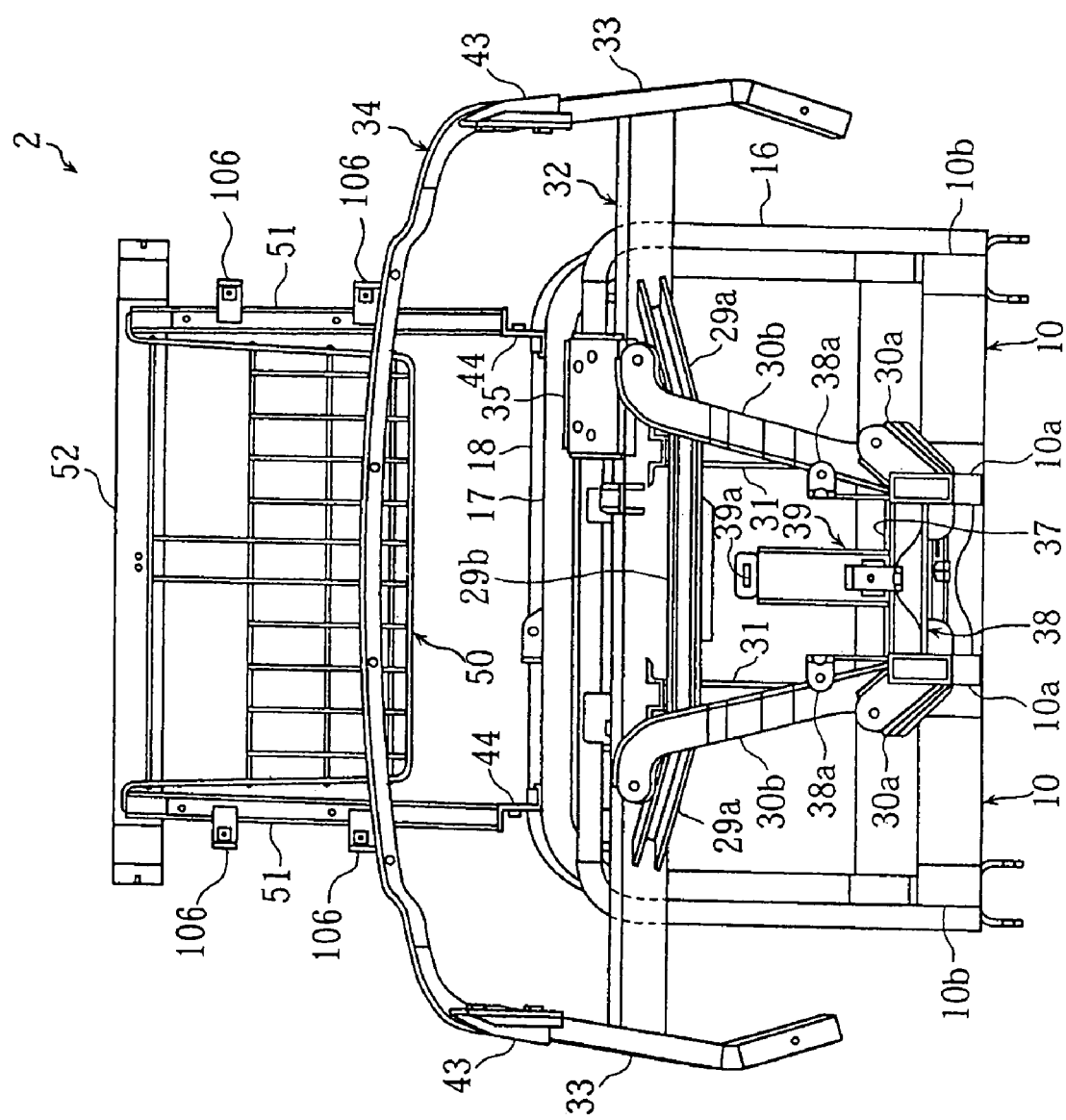
FIG. 4 is a front view of the vehicle body frame.

Hereinafter, preferred embodiments of the present invention will be described based on the attached drawings. FIG. 1 to FIG. 25 are views for describing a passenger golf car (small-sized vehicle) according to preferred embodiments of the present invention. Note that in the description of the preferred embodiments, front, rear, left and right indicate front, rear, left and right viewed by an occupant in a state of sitting on a seat.

In the drawings, 1 denotes a passenger golf car for use on, for example, on a golf course. The golf car 1 has a vehicle body frame 2 constituting a skeletal structure thereof, left and right front wheels 3 disposed at left and right front end positions of the vehicle body frame 2, left and right rear wheels 4 disposed at left and right rear end positions, a steering system 6 disposed between the left and right front wheels 3, a seat unit 7 disposed on the rear side of the steering system 6, a power unit 5 for rotary driving of the left and right rear wheels 4, a floor panel 8 disposed on the vehicle body frame 2 between the front and the rear wheels 3, 4, and a roof 40 covering an upper side of a passenger compartment, and a vehicle body cover 9 enclosing the periphery of the vehicle body.

The vehicle body frame 2 has left and right main frames 10 arranged on the left and right sides of the vehicle and extending in a forward and backward direction, and front, middle, rear cross pipes 11, 12, 13 coupling the front, middle, rear portions of the left and right main frames 10. The left and right main frames 10 and the respective cross pipes 11, 12, 13 are preferably constituted of longitudinally extending, substantially square pipes. Further, on the front end and the rear end of the vehicle body frame 2, a front bumper 14 and a rear bumper 15 are attached, respectively.

Front portions 10*a* of the left and right main frames 10, in a plan view from the above, are bent to deviate inward in the vehicle width direction so as to be located farther inside as compared to the middle portions 10*b* and rear portions 10*c* thereof, and thus, having a narrower width. Further, when seen from the front, the front portions 10*a* of the left and right main frames 10 rise slightly upward, and the rear portions 10*c* are bent so as to curve upward.

On the middle portions 10*b* of the left and right main frames 10, a seat cross frame 16 is connected, and on the rear portions 10*c*, a pair of front-side and rear-side rear cross frames 17, 18 is connected respectively. These seat cross frame 16 and front-side and rear-side rear cross frames 17, 18 each preferably have a Π shape having left and right vertical side portions 16*a*, 17*a*, 18*a* extending up from the left and right main frames 10, and horizontal side portions 16*b*, 17*b*, 18*b* connecting upper end portions of the left and right vertical side portions 16*a*, 17*a*, 18*a* with each other.

Between the seat cross frame 16 and the front-side rear cross frame 17, the seat unit 7 is mounted. The seat unit 7 preferably includes a bench-type seat cushion 24 for two persons, and a seat back 25 arranged to extend up from a rear edge of the seat cushion 24. The left and right sides of the seat cushion 24 are a driver seat and a passenger seat, respectively.

Further, on the left and right outer end portions of the seat cushion 24, arm rests 26, 27 are disposed.

The seat cushion 24 is supported in a vertically openable/closable manner via a seat hinge (not shown) on the horizontal side portion 16b of the seat cross frame 16. Under the seat cushion 24, a battery unit (not shown) defining a power supply for the power unit 5 and so on are arranged.

Below the rear-side rear cross frame 18, a rear wheel shaft unit 4a supporting the left and right rear wheels 4 is arranged. The rear wheel shaft unit 4a is constituted of a not-shown rear wheel shaft coupled to the rear wheels 4 and a not-shown rear wheel shaft housing which rotatably supports the rear wheel shaft. Between the rear wheel shaft unit 4a and the left and right main frames 10, a rear suspension system 46 vertically swingably supporting the left and right rear wheels 4 is disposed. The suspension system 46 preferably has the following structure.

Figure 5:
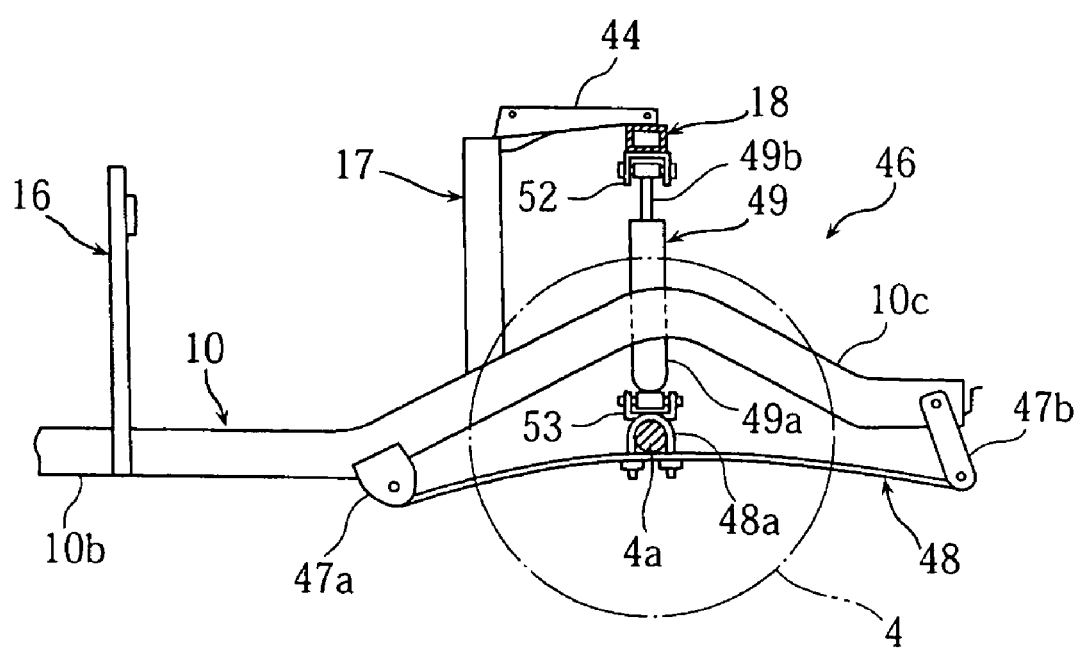
FIG. 5 is a side view of a rear suspension system supported on the vehicle body frame.

As shown in FIG. 5, under the rear portions 10c arranged to curve upward from the left and right main frames 10, leaf springs 48 are disposed. On a front end portion of each rear portion 10c, a front support bracket 47a is joined preferably by welding, and on a rear end portion thereof, a rear support bracket 47b is swingably and pivotally supported. Front and rear end portions of each leaf spring 48 is pivotally supported by the front and rear support brackets 47a, 47b. On middle portions in the forward and backward direction of the leaf springs 48, the rear wheel shaft unit 4a is supported and fixed preferably by U-shape bolts 48a.

Further, damper units 49 are interposed between the rear wheel shaft unit 4a and the rear-side rear cross frame 18. The damper units 49 each have a schematic structure such that a piston (not shown) in which a communication passage is formed to generate a damping force is slidably inserted to and arranged in a cylinder 49a, and a piston rod 49b connected to the piston is projected upward. The piston rod 49b is pivotally supported by a bracket 52 fixed to an under surface of the horizontal side portion 18b of the rear cross frame 18, and a lower end portion of the cylinder 49a is pivotally supported by a bracket 53 fixed to the rear wheel shaft unit 4a.

On the front portions 10a of the left and right main frames 10, front and rear suspension brackets 30a, 30b are joined preferably by welding at a predetermined interval. On the front and rear suspension brackets 30a, 30b, a front suspension system 28 vertically swingably supporting the left and right front wheels 3 is disposed. The front suspension system 28 preferably has the following structure.

Figure 6:
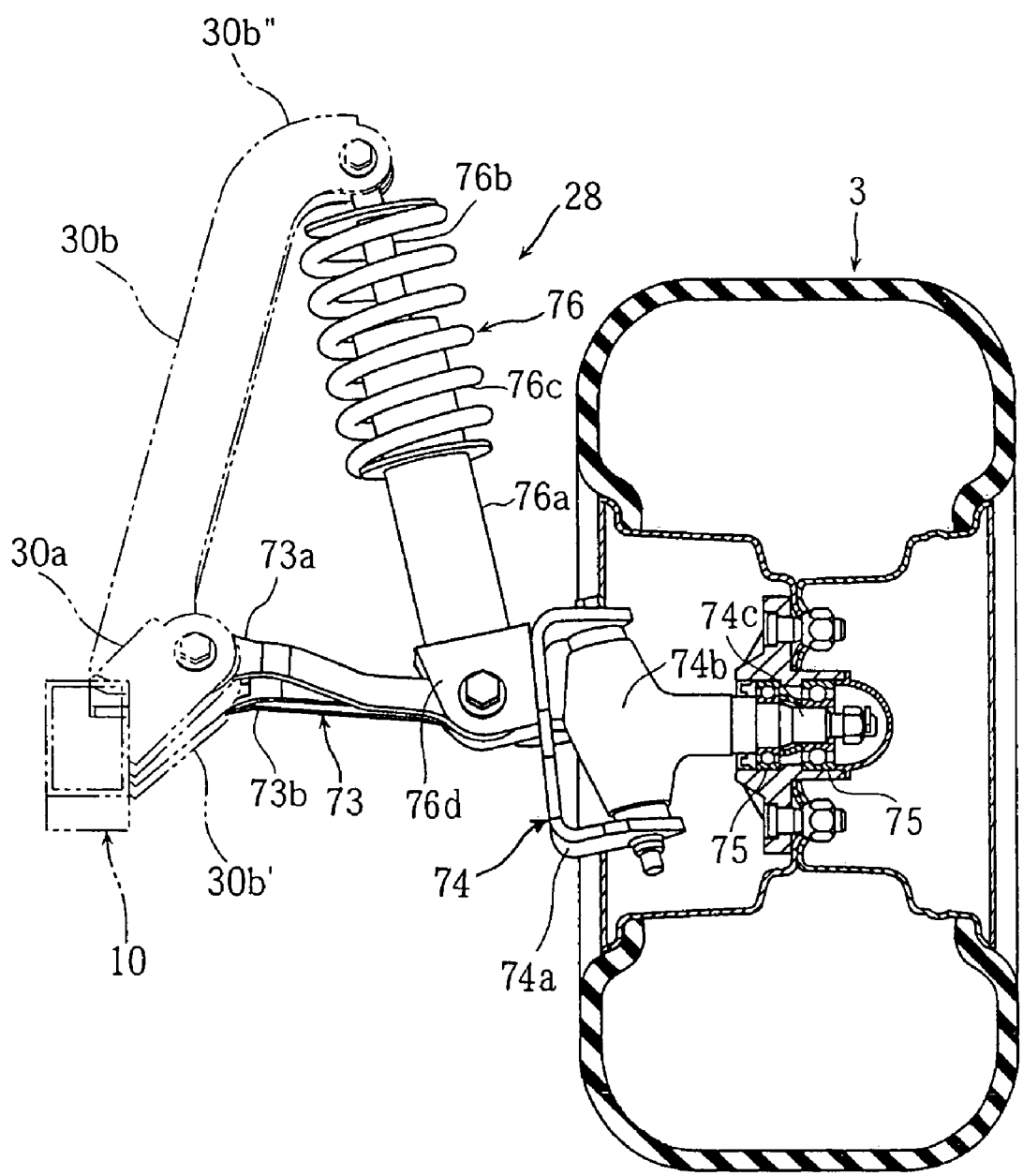
FIG. 6 is a front view of a front suspension system supported on the vehicle body frame.
Figure 7:
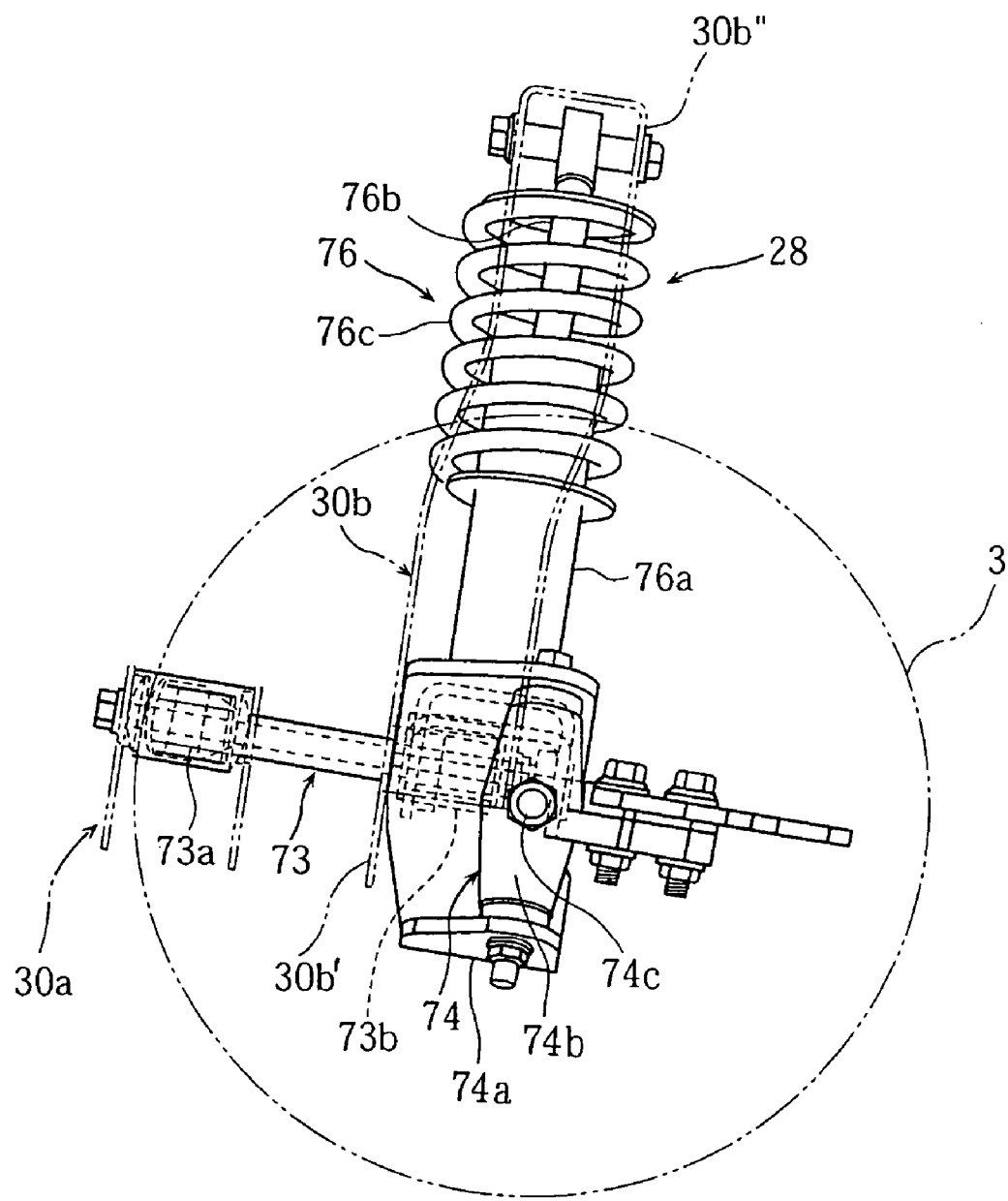
FIG. 7 is a left side view of the front suspension system.

As shown in FIG. 6 and FIG. 7, the front suspension bracket 30a and a lower end portion 30b' of the rear suspension bracket 30b support front and rear base portions 73a, 73b of an arm 73 having a fork shape in a vertically swingable manner about a fore and aft axis. On an outer end portion of the arm 73, a lower end bracket 76d of a later-described cushion unit 76 is supported in a rotatable manner about a fore and aft axis. On the lower end bracket 76d, a bracket 74a constituting one side of a knuckle 74 is joined preferably by welding. To the bracket 74a, a knuckle shaft 74b constituting the other side of a knuckle 74 is supported so as to be swingable back and forth about a vertically extending axis. On the knuckle shaft 74b, a shaft portion 74c is arranged to project outward, and the shaft portion 74c rotatably supports the front wheel 3 with bearings 75 interposed therebetween.

The rear suspension bracket 30b is arranged to extend upward from the lower end portion 30b'. Between an upper end portion 30b'' of this rear suspension bracket 30b and the arm 73, a cushion unit 76 is interposed.

This cushion unit 76 has a schematic structure such that a piston (not shown) in which a communication passage is formed to generate a damping force is slidably inserted to a cylinder 76a, a piston rod 76b connected to the piston is projected upward, and further a coil spring 76c is interposed between the piston rod 76b and the cylinder 76a. A lower end portion of the cylinder 76a is coupled to the lower end bracket 76d. An upper end portion of the piston rod 76b is pivotally supported by the upper end portion 30b' of the rear suspension bracket 30b.

Positions on the left and right front portions 10a where the front suspension brackets 30a are provided are coupled to each other by a cross member 38 extending in the vehicle width direction. To the cross member 38, there is connected an engaging bracket 39 which supports a lower end portion of a later-described front cowl 56 in an attachable/detachable manner. Incidentally, elements 38a are bumper brackets supporting the front bumper 14.

Further, on rear sides of the left and right rear suspension brackets 30b, support posts 31 are arranged to extend up from the front portions 10a of the main frames 10. On top end portions of the left and right support posts 31, a crossbeam member 32 extending in the vehicle width direction is connected. Left and right end portions of the crossbeam member 32 and the left and right rear suspension brackets 30b are coupled by left and right reinforcing members 29a, and the left and right rear suspension brackets 30b are coupled to each other by a reinforcing member 29b. Then, the reinforcing members 29a, 29b and the crossbeam member 32 define a generally trapezoidal shape in a plan view.

To left and right end surfaces of the crossbeam member 32, there are connected intermediate portions in the vertical direction of front pipes 33 which slightly incline obliquely such that upper portions thereof become the front side when seen from the side of the vehicle. When seen from the side of the vehicle, the main frames 10, the support posts 31 and a later-described front panel portion 8b of the floor panel 8 fixed to the front pipes 33 define a generally triangle shape (refer to FIG. 3).

On a left side portion in the vehicle width direction of the crossbeam member 32, a steering support bracket 35 is joined preferably by welding. The support bracket 35 supports a steering column 36 of the steering system 6. The steering column 36 extends backward and obliquely upward to the passenger compartment side, and inside the steering column 36, a steering shaft 36a is supported rotatably. On an upper end of the steering shaft 36a, a steering wheel 36b is fixed, and to a lower end thereof, the knuckles 74 of the left and right front wheels 3 are coupled via a not-shown gear box and tie rod. The gear box is fixed to a gear box bracket 37 connected between the left and right front portions 10a.

Upper end portions of the left and right front pipes 33 are connected to a dashboard support member 34 extending in the vehicle width direction. The dashboard support member 34 preferably has a generally arc shape opening downward when seen from the front of the vehicle. Incidentally, lower ends of the left and right front pipes 33 are connected to nothing, and thus, they are free.

The power unit 5 is constructed such that an electric motor 5a whose power is supplied by a battery unit and a reduction gear 5b are integrated. The electric motor 5a and the reduction gear 5b are arranged between the vertical side portions of the left and right main frames 10 of the rear-side rear cross frame 18. An output shaft 5c of the electric motor 5a is coupled to the rear wheel shaft of the rear wheel shaft unit 4a via the reduction gear 5b, and a housing of the reduction gear 5b is coupled to and fixed on the housing of the rear wheel shaft unit 4a. Further, the rear wheels 4 are coupled to end portions of the rear wheel shaft. Incidentally, it is possible as a matter of course to use a gasoline engine instead of the electric motor.

The vehicle body cover 9 includes a front cover 20 covering a front portion of the vehicle body frame 2, a rear cover 21 covering a rear portion thereof, left and right side covers 22 covering areas between the front cover 20 and the rear cover 21.

The rear cover 21 has a structure such that a seat cover portion 21a arranged to surround a front side of a lower portion of the seat cushion 24 and left and right sides thereof, and a rear cowl portion 21b extending backward from the seat cover portion 21a to cover an upper side of the left and right rear wheels 4 are integrally formed.

On the rear cowl portion 21b between the left and right rear wheels 4, a golf bag rack 21c is preferably defined by a recess. Further, a bucket 50 is arranged on the back side of the seat back 25. This bucket 50 is fixed on left and right stays 51, and between rear ends of the left and right stays 51, a support member 52 for supporting and fixing a golf bag is attached. The left and right stays 51 are fixed preferably by bolts on left and right rear roof brackets 44 which are laid across the front-side and rear-side rear cross frames 17, 18 and coupled thereto.

Figure 8:
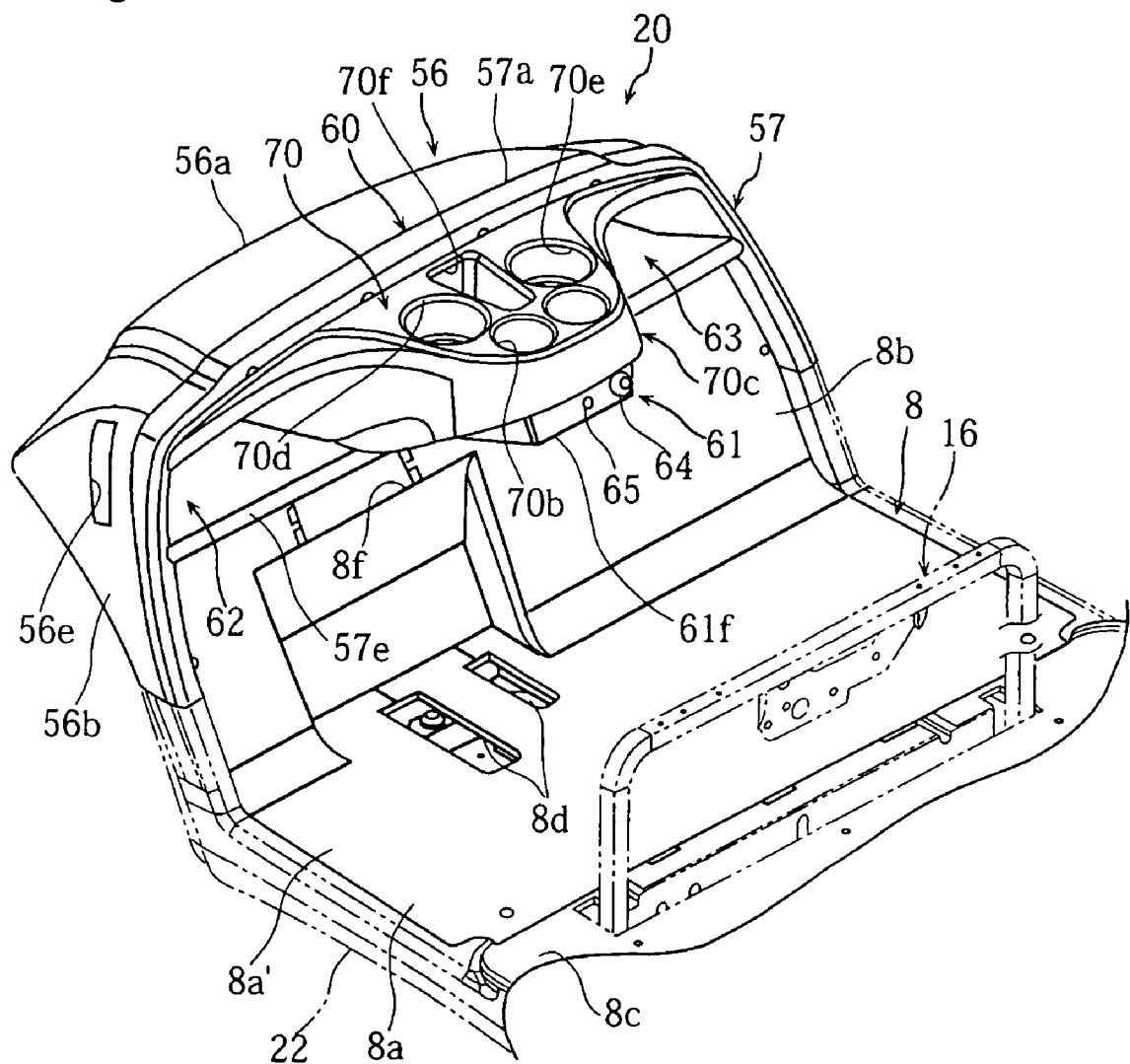
FIG. 8 is a perspective view of a front cover disposed on the vehicle body frame.
Figure 9:
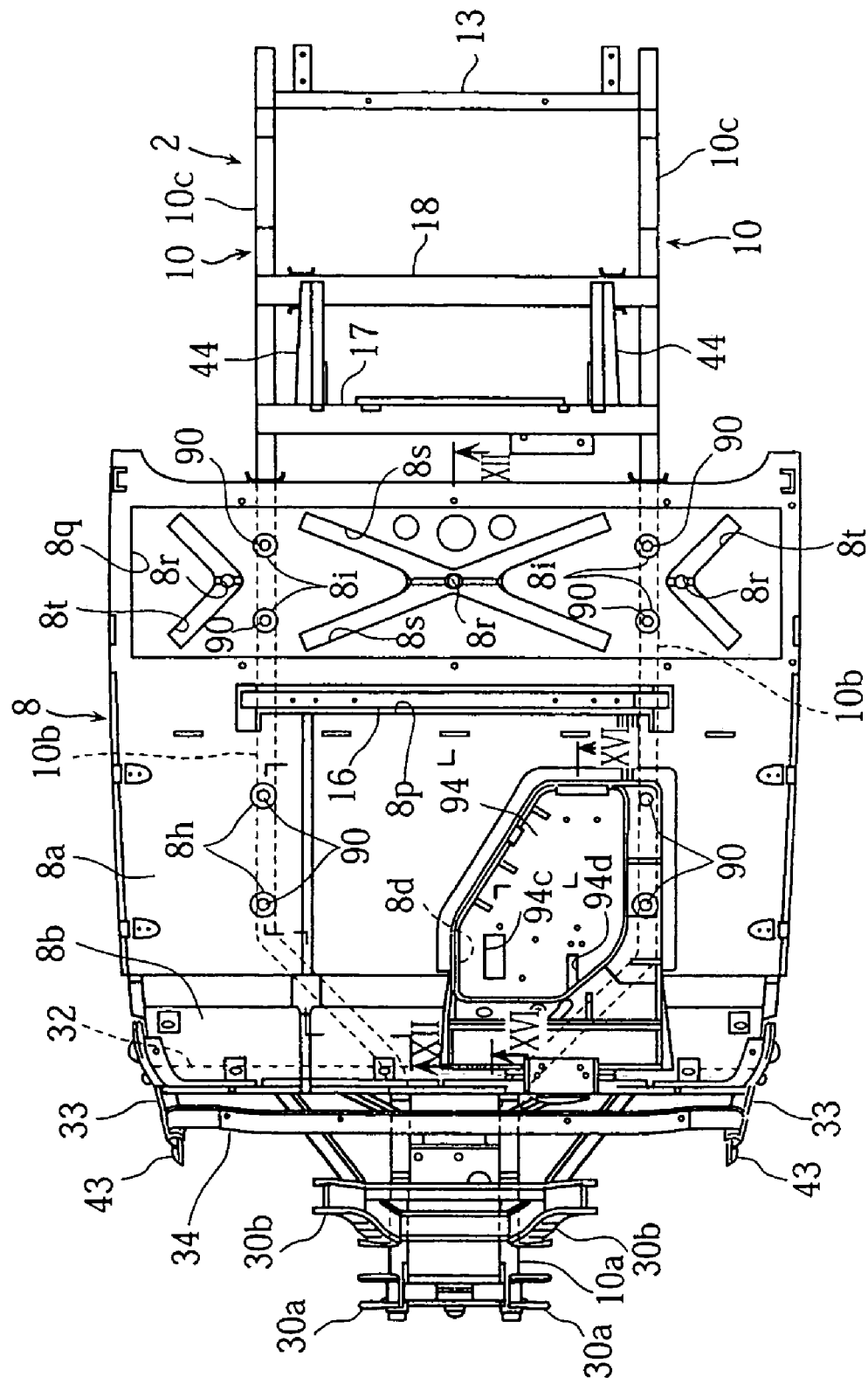
FIG. 9 is a plan view of a floor panel arranged on the vehicle body frame.
Figure 10:
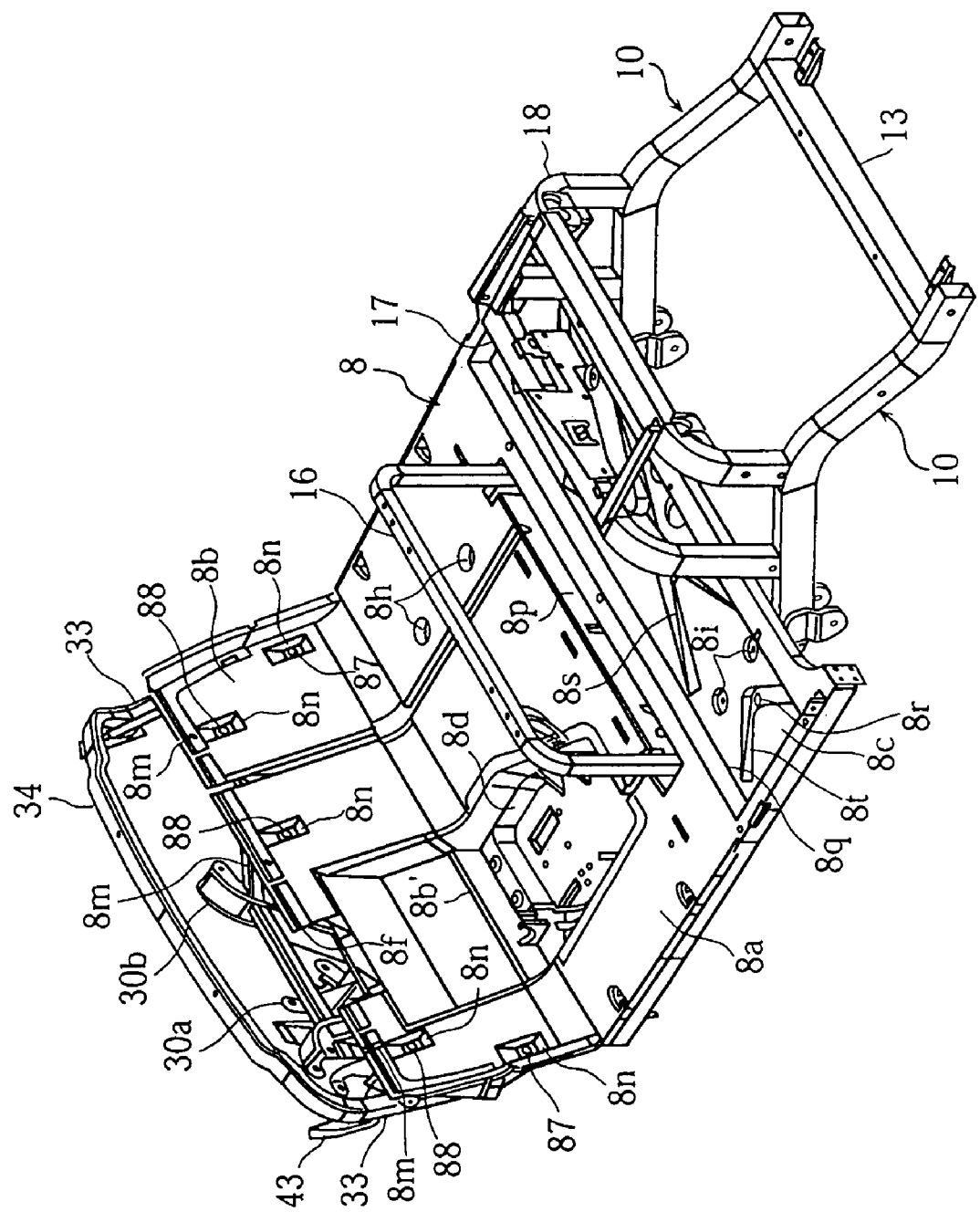
FIG. 10 is a perspective view of the floor panel.
Figure 11:
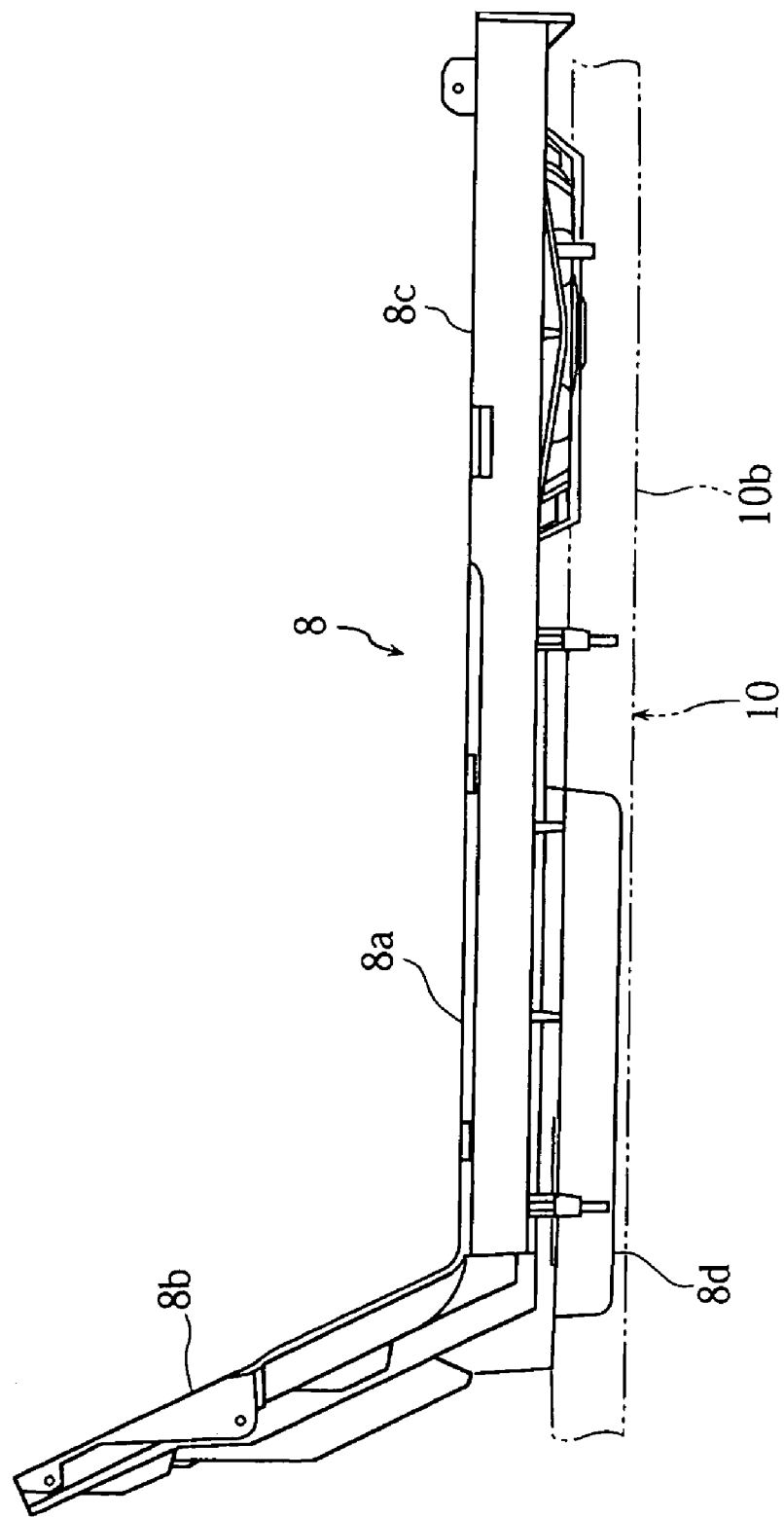
FIG. 11 is a left side view of the floor panel.
Figure 12:
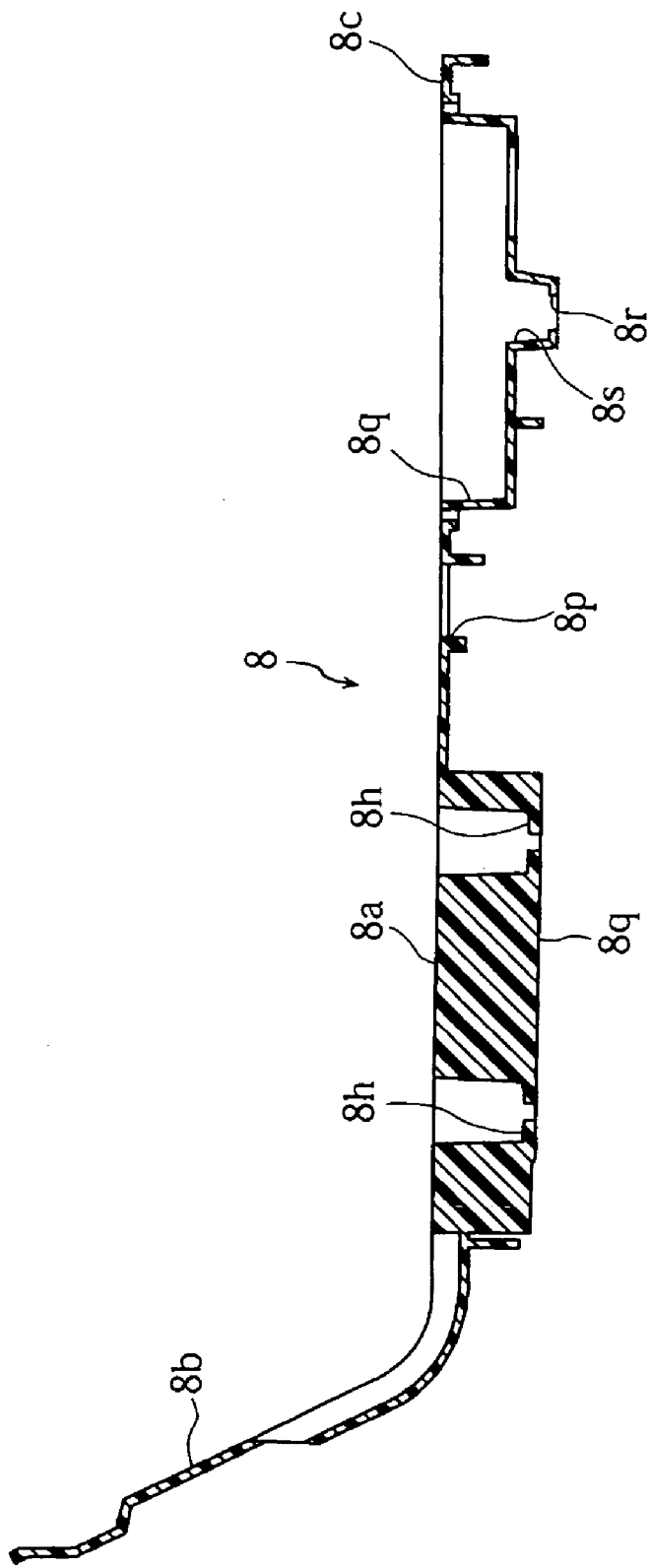
FIG. 12 is a cross-sectional side view of the floor panel.

The front cover 20 has, as shown in FIG. 8, a front cowl 56 covering an upper side of the left and right front wheels 3 and a dashboard 57 covering a rear side of the front cowl 56.

The front cowl 56 has a cowl front surface portion 56a extending forward and downward with a curve from a front edge portion 57a of the dashboard 57, and cowl side surface portions 56b extending toward left and right sides. On each of the left and right cowl side surface portions 56b, a roof pillar insertion hole 56e having a substantially rectangular shape extending generally in a vertical direction is formed.

The dashboard 57 has a structure such that a width direction extending portion 60 extending in the vehicle width direction and a projecting portion 61 projecting rearward from a middle portion in the vehicle width direction of the width direction extending portion 60 are integrally formed of resin.

The projecting portion 61 is arranged to have a projection amount such that a rear end surface thereof is located slightly forward from the knees of an occupant sitting on the seat cushion 24. On left and right side portions in the vehicle width direction of this projecting portion 61, left and right side housing portions 62, 63 preferably having a substantially cylindrical shape extending forward are integrally formed. Further, on a rear end wall of the projecting portion 61, a pilot lamp 65 and a maintenance switch 64 are preferably arranged substantially in parallel with each other on the left and right in the vehicle width direction.

On the projecting portion 61, an article housing member 70 is fitted from an upper side in an attachable/detachable manner. The article housing member 70 includes left and right first cup holders 70b, 70c located on a rear end portion of the projecting portion 61, left and right second cup holders 70d, 70e located on the front side of the first cup holders 70b, 70c, and a central housing portion 70f located between the left and right second cup holders 70d, 70e. The cup holders 70b, 70c, 70d, 70e allow an occupant to insert and remove of a cup, a plastic bottle, or the like from the top while being seated on the seat cushion 24.

The roof 40 is preferably formed of resin in a generally rectangular shape covering the upper side of the above-described front cover 20, floor panel 8, seat unit 7, and rear cover 21 in a plan view.

The roof 40 has a structure such that, as shown in FIG. 18 to FIG. 25, substantially cylindrical reinforcing members 40c extending in a forward and backward direction are integrally formed at predetermined intervals in the vehicle width direction on the roof main body 40b, which has a structure in which a central portion is higher than its peripheral portion. Further, on left and right side portions of an under surface of the roof main body 40b, grips 80 for being held by an occupant are preferably provided.

Figure 20:
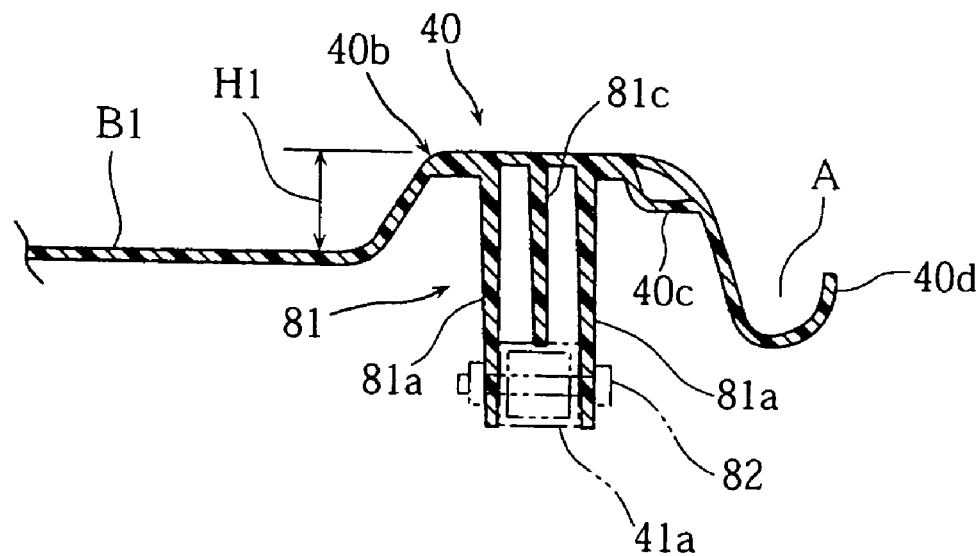
FIG. 20 is a cross-sectional view of the roof.
Figure 21:
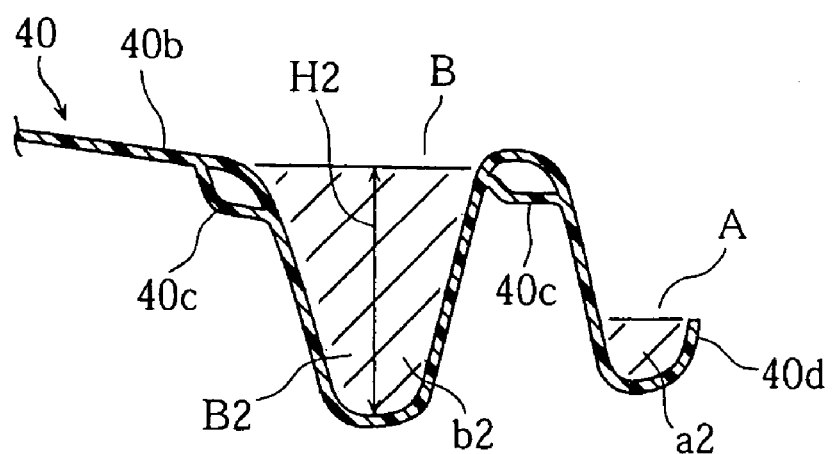
FIG. 21 is a cross-sectional view of the roof.
Figure 22:
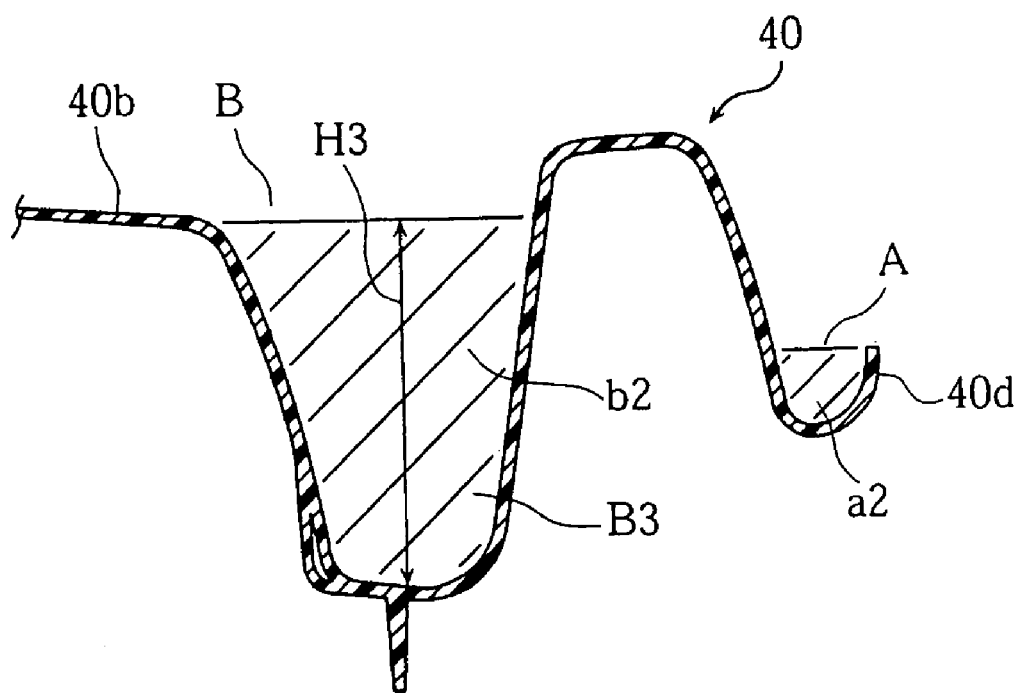
FIG. 22 is a cross-sectional view of the roof.
Figure 23:
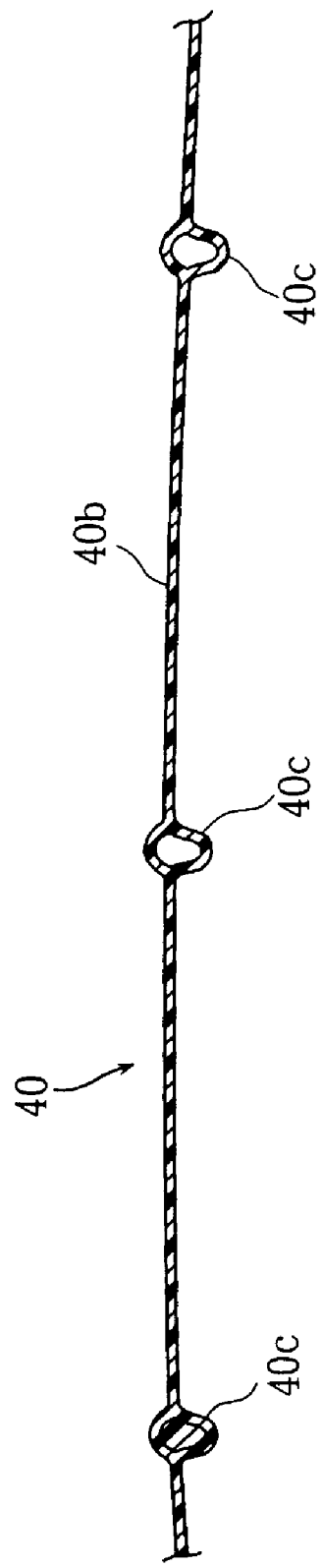
FIG. 23 is a cross-sectional view of the roof.
Figure 24:
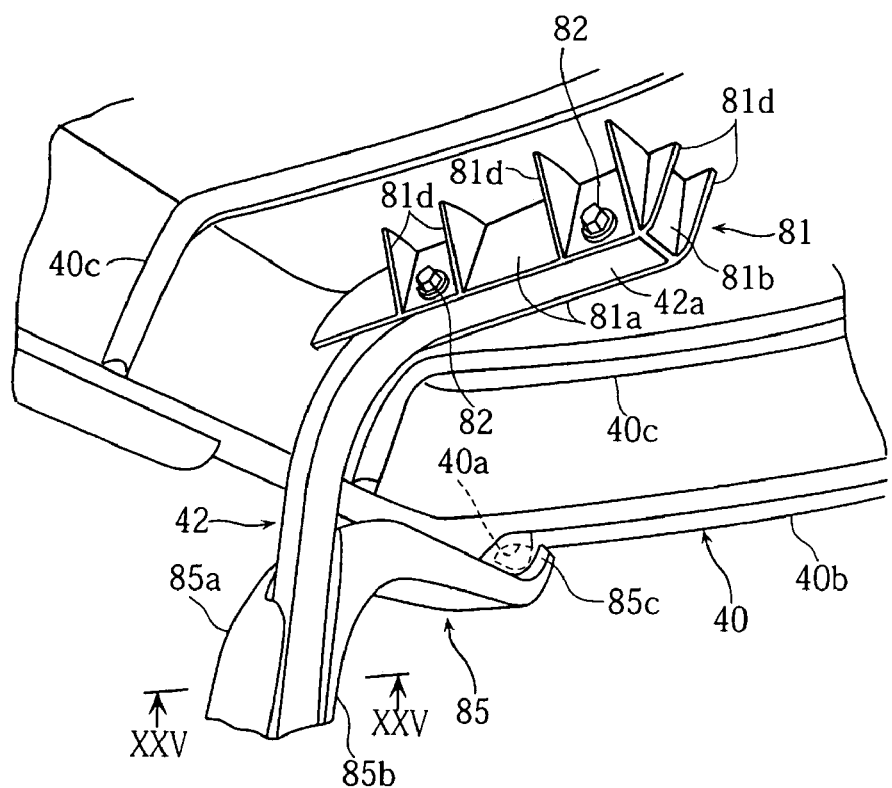
FIG. 24 is a perspective view of a drain hose of the roof.

On left and right corners of the under surface of the roof main body 40b, pillar attaching portions 81 are integrally formed. Each of the pillar attaching portions 81 has, as shown in FIG. 20 and FIG. 24, left and right vertical walls 81a extending in the forward and backward direction, an inside vertical wall 81b coupling inner end surfaces of the left and right vertical walls 81a to each other, and a restricting rib 81c disposed between the left and right vertical walls 81a and extending substantially parallel with the vertical walls 81a. Further, on the outside of the left and right vertical walls 81a, a plurality of reinforcing ribs 81d are provided.

To the attaching portions 81 on left and right front sides of the roof 40, upper end portions 41a of front roof pillars 41 extending in the vertical direction are connected, and similarly, to the attaching portions 81 on left and right rear sides thereof, upper end portions 42a of rear roof pillars 42 extending in the vertical direction are connected. The upper end portions 41a, 42a of the respective roof pillars 41, 42 are bent inward. Specifically, by inserting the upper end portion 42a of the roof pillar 42 to the attaching portion 81, movement of the upper end portion 42a in the vehicle width direction is restricted by the left and right vertical walls 81a, and inward movement thereof is restricted by the inner vertical wall 81b (refer to FIG. 24). Furthermore, upward movement thereof is restricted by the restricting rib 81c as shown in the roof cross sectional view (FIG. 20) on the front side. In this state, the upper end portion 42a is sandwiched and fixed by the left and right vertical walls 81a preferably with two fixing bolts 82 inserted through the left and right vertical walls 81a (refer to FIG. 20 and FIG. 24). Incidentally, attachment of the upper end portions 41a of the left and right front roof pillars 41 is preferably the same as described above.

Lower end portions 41b of the left and right front roof pillars 41 are inserted through the insertion holes 56e in the front cowl 56 and fixed by bolts to left and right front roof brackets 43 which are joined to the left and right front pipes 33. To the left and right rear roof brackets 44 laid across the front-side and rear-side rear cross frames 17, 18 and joined on upper surfaces thereof, the stays 51 are fixed preferably by bolts, respectively, and on an approximately middle position of each of the left and right stays 51, a pair of upper and lower roof brackets 106 is preferably welded. Lower end portions 42b of the left and right rear roof pillars 42 are fixed preferably by bolts to the vertically arranged roof brackets 106 on the left and right sides respectively (refer to FIG. 1 to FIG. 4).

On the roof 40, a weir 40d is formed in a trench shape opening upward, which extends along the entire circumference of the roof main body 40b from a front edge to left and right edges and from the left and right edges to a rear edge. The weir 40d defines a first rain gutter A on an inside portion of the roof main body 40b. The first rain gutter A preferably has substantially the same trench width along the entire circumference thereof.

On a portion inside the first rain gutter A of the roof main body 40b, a second rain gutter B preferably having a substantially rectangular annular shape is formed by recessing. The trench width W1 of a front rain gutter portion B1 of the second rain gutter B is preferably larger than trench widths W2, W3 of left and right rain gutter portions B2, B2 and a rear rain gutter portion B3. The trench depth H1 of the front rain gutter portion B1 is preferably smaller than the trench depth H2 of the left and right rain gutter portions B2. Further, the trench depth H3 of the rear rain gutter B3 is preferably larger than the trench depth H2 of the left and right rain gutter portions B2 (refer to FIG. 19 to FIG. 22). A portion of rainwater that falls on a roof center portion inside the second rain gutter B flows into the front rain gutter portion B1 and flows to the left and right rain gutter portions B2 on the downstream. These flows are joined by part of rainwater flowing from the roof center portion into the left and right rain gutter portions B2 to flow further downstream, and further joined by rest of rainwater flowing from the roof center portion into the rear rain gutter portion B3 to thereby flow outside together.

Figure 19:
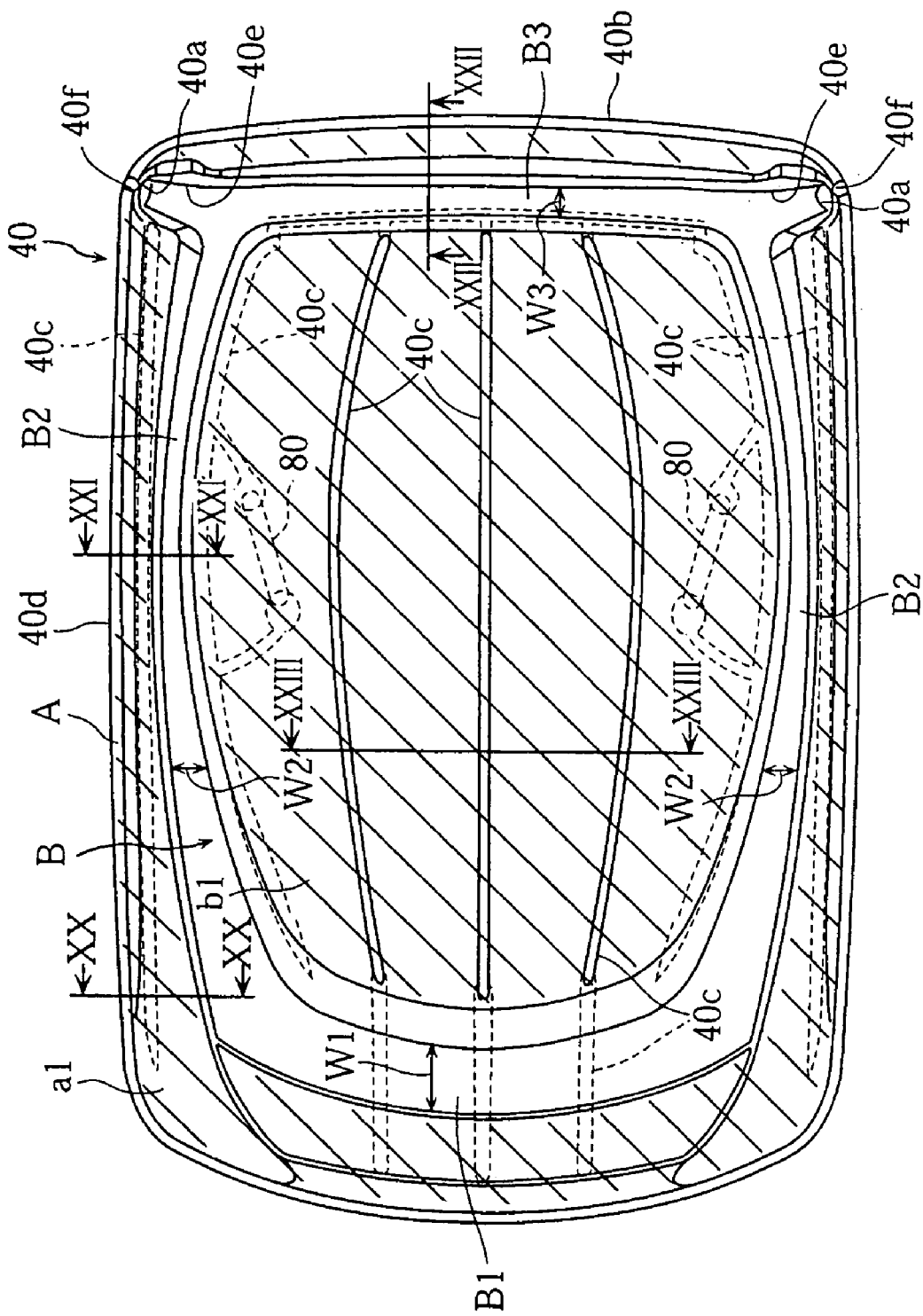
FIG. 19 is a plan view of the roof.

A roof area b1 surrounded by the second rain gutter B of the roof main body is preferably larger than an outside roof area a1 surrounded by the first rain gutter A and the second rain gutter B (refer to FIG. 19). Further, a passage cross sectional area b2 of the second rain gutter B is preferably larger than a passage cross sectional area a2 of the first rain gutter A (refer to FIG. 21 and FIG. 22).

At intersections of the left and right rain gutter portions B2 and the rear rain gutter portion B3 at the left and right rear end portions of the roof main body 40b, drain passages 40e are formed by recessing. Further, in the left and right rear end portions of the roof main body 40b, drain holes 40a communicating with the drain passages 40e are formed, and the drain holes 40a are open to the lower surface of the roof main body 40b. Rainwater flowing into the second rain gutter B passes the left and right drain passages 40e and flows down outside the roof through the drain holes 40a.

Cut-outs 40f are formed in left and right rear corner portions of the weir 40d. Through the left and right cut-outs 40f, the first rain gutter A communicates with the drain passages 40e. Accordingly, rainwater flowing into the first rain gutter A passes the left and right cut-outs 40f and the drain passages 40e and flows down outside the roof through the drain holes 40a.

Figure 25:
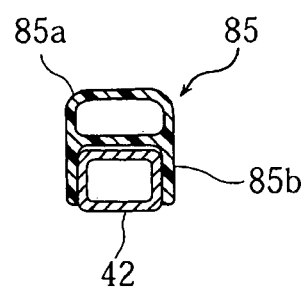
FIG. 25 is a cross-sectional view of the drain hose.

To the left and right drain holes 40a, upper end openings 85c of drain hoses 85 are connected as shown in FIG. 24 and FIG. 25. The left and right drain hoses 85 are supported by the rear roof pillars 42, and lower end openings (not shown) of the drain hoses 85 are located inside the rear cowl portion 21b, which is lower than the seat surface of the seat cushion 24.

The left and right drain hoses 85 each have a substantially cylindrical passage portion 85a in which rainwater flows down and a holding portion 85b having a substantially U-shape cross section integrally formed with the passage portion 85a. By making the holding portion 85b hold the rear roof pillar 42, the drain hose 85 is arranged along the rear roof pillar 42. The drain hose 85 is preferably painted with the same color as the rear roof pillar 42, so that it appears to be a single body with the rear roof pillar 42.

The floor panel 8 has a structure such that, as shown mainly in FIG. 9 to FIG. 17, a foot panel portion 8a on which an occupant sitting on the seat unit 7 places his/her feet, a front panel portion 8b that extends continuously from a front edge of the foot panel portion 8a and is arranged to extend obliquely upward between the front suspension system 28 and the legs of the occupant, and a battery mounting portion 8c as a later-described item placement panel portion arranged to extend rearward continuously from a rear edge of the foot panel portion 8a are integrally formed of resin. This floor panel 8 made of resin is arranged and fixed on the vehicle body frame 2.

A measurement of the floor panel 8 in the vehicle width direction is preferably larger than a measurement from the left to the right main frame 10 in the vehicle width direction. More specifically, the measurement of the floor panel 8 in the vehicle width direction is set to approximately double of the measurement from the left to the right main frame 10 in the vehicle width direction. Thus, left and right side portions of the floor panel 8 protrude outward from the left and right main frames 10 in the vehicle width direction.

Figure 13:
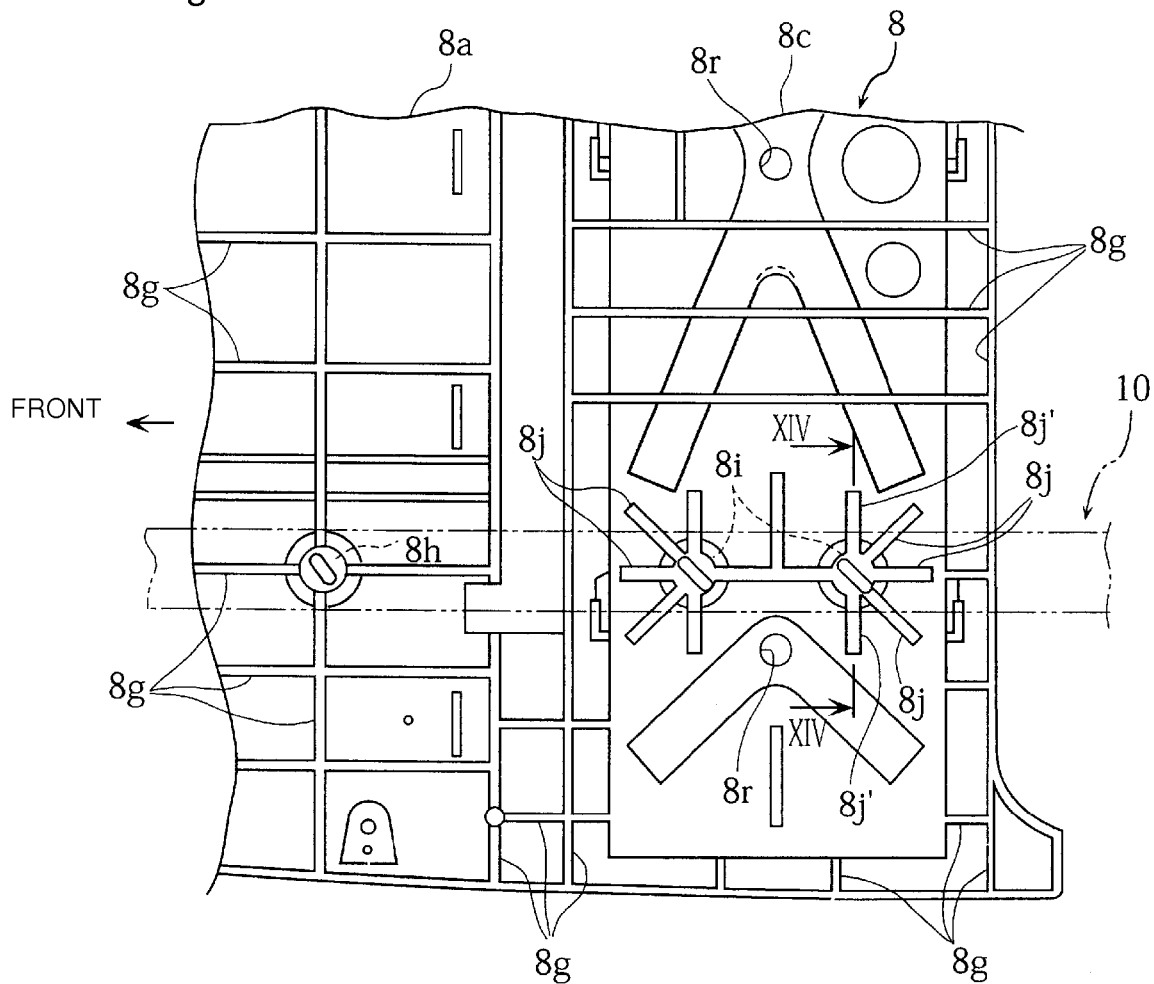
FIG. 13 is a bottom view of the floor panel.
Figure 14:
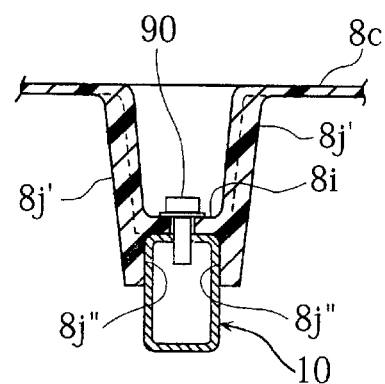
FIG. 14 is a cross-sectional view (cross-sectional view taken along the XIV-XIV line in FIG. 13) of a vehicle body frame fixing part of the floor panel.

On under surfaces of the foot panel portion 8a and the battery mounting portion 8c, a large number of reinforcing ribs 8g extending in the forward and backward direction and in the vehicle width direction are preferably provided, as shown in FIG. 13 and FIG. 14. On positions of the foot panel portion 8a opposing the left and right main frames 10, a pair of front and rear attachment seats 8h is formed by recessing, and the respective attachment seats 8h are provided at intersections of the front and rear and the left and right reinforcing ribs 8g.

Further, on positions of the battery mounting portion 8c opposing the left and right main frames 10, a pair of front and rear attachment seats 8i is formed by recessing. From each of these attachment seats 8i, a plurality of ribs 8j extending radially outward are provided. Among these ribs 8j, each rib on both sides in the vehicle width direction located on a back side of the attachment seat 8i on the right side and rear side of the vehicle has a different shape and is referred to as 8j'.

The upper surface of the main frame 10 abuts the tips of the ribs 8j, so that each rib 8j preferably has the same rib height. However, while a portion of the rib 8j' on the center side of each attachment seat 8i has the same height as the ribs 8j, outside portions thereof have a higher rib height so that they abut side surfaces of the main frame 10. This portion to which the side surface of the main frame 10 abuts forms a cut-out 8j". The left and right cut-outs 8j" define positioning portions which engage with the left and right side surfaces of the main frame 10 to restrict the position of the floor panel 8 in the vehicle width direction. The floor panel 8 is arranged on the left and right main frames 10 and the left and right cut-outs 8j" engage with both the side surfaces of the main frames 10 to thereby determine the position in the vehicle width direction, and in this state the respective attachment seats 8h, 8i are fastened and fixed preferably by fixing bolts 90 to the main frames 10.

Further, on left and right side end portions and an upper side portion of the front panel portion 8b, a plurality of attachment seats 8n are arranged to have a forward recessed shape at predetermined intervals, respectively. Among them, left and right attachment seats 8n are fastened and fixed preferably by bolts 87 to the left and right front pipes 33. Further, each attachment seat 8n on the upper side portion are fastened and fixed preferably by bolts 88 to the crossbeam member 32.

Figure 15:
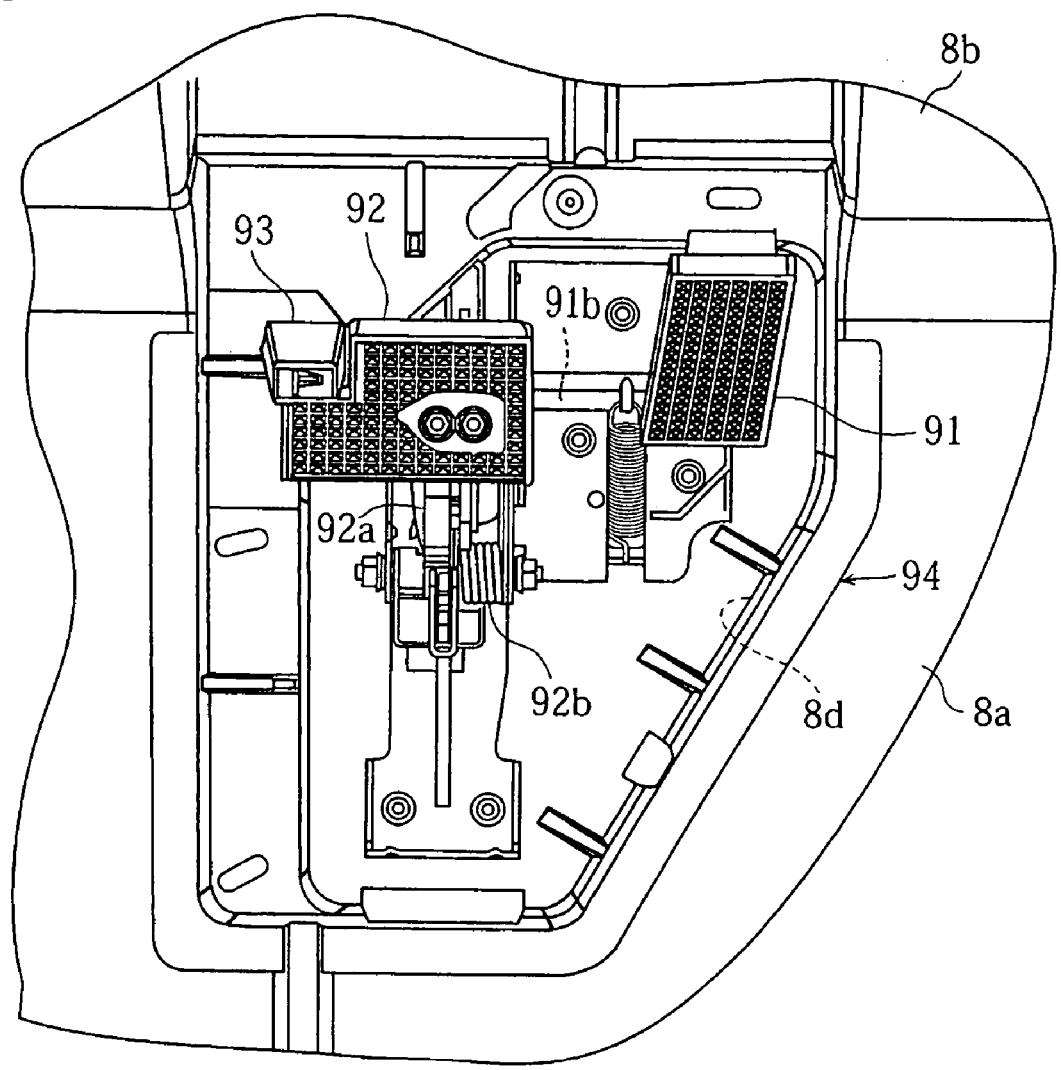
FIG. 15 is a plan view of operation pedals disposed on the floor panel.
Figure 16:
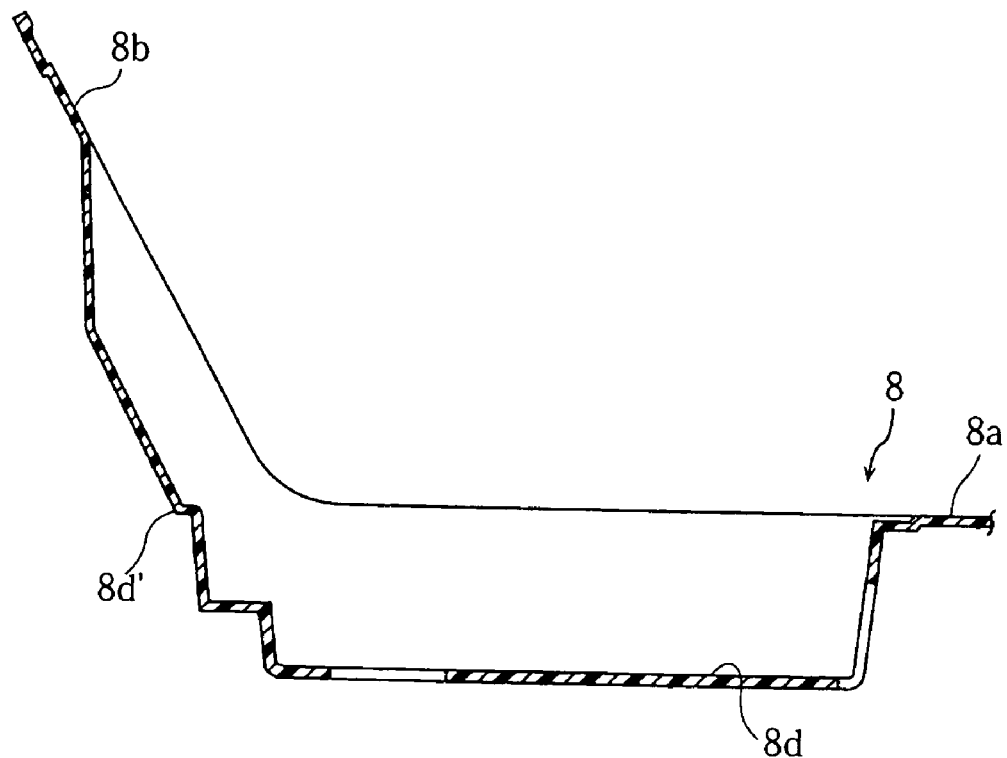
FIG. 16 is a cross-sectional view of a recess portion of the floor panel.
Figure 17:
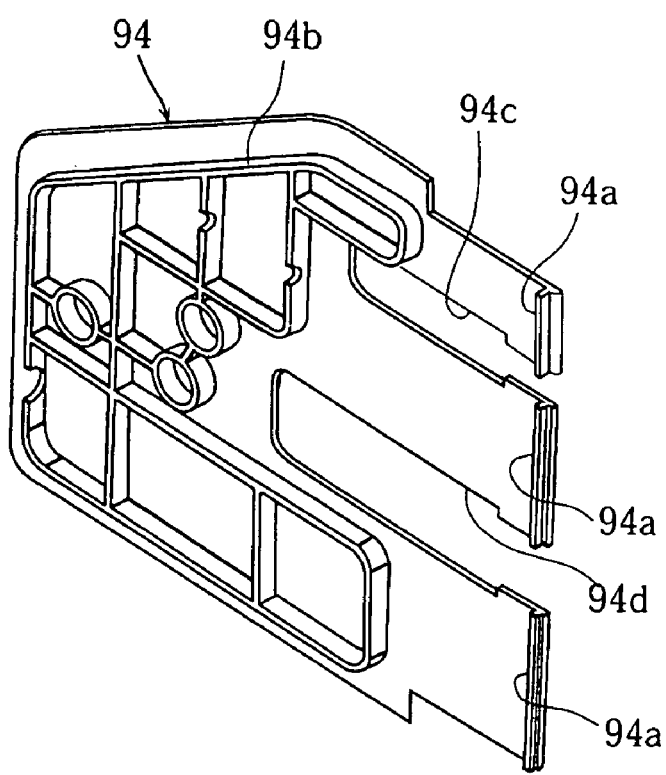
FIG. 17 is a perspective view of the bottom side of a lid member disposed on the recess portion.
Figure 18:
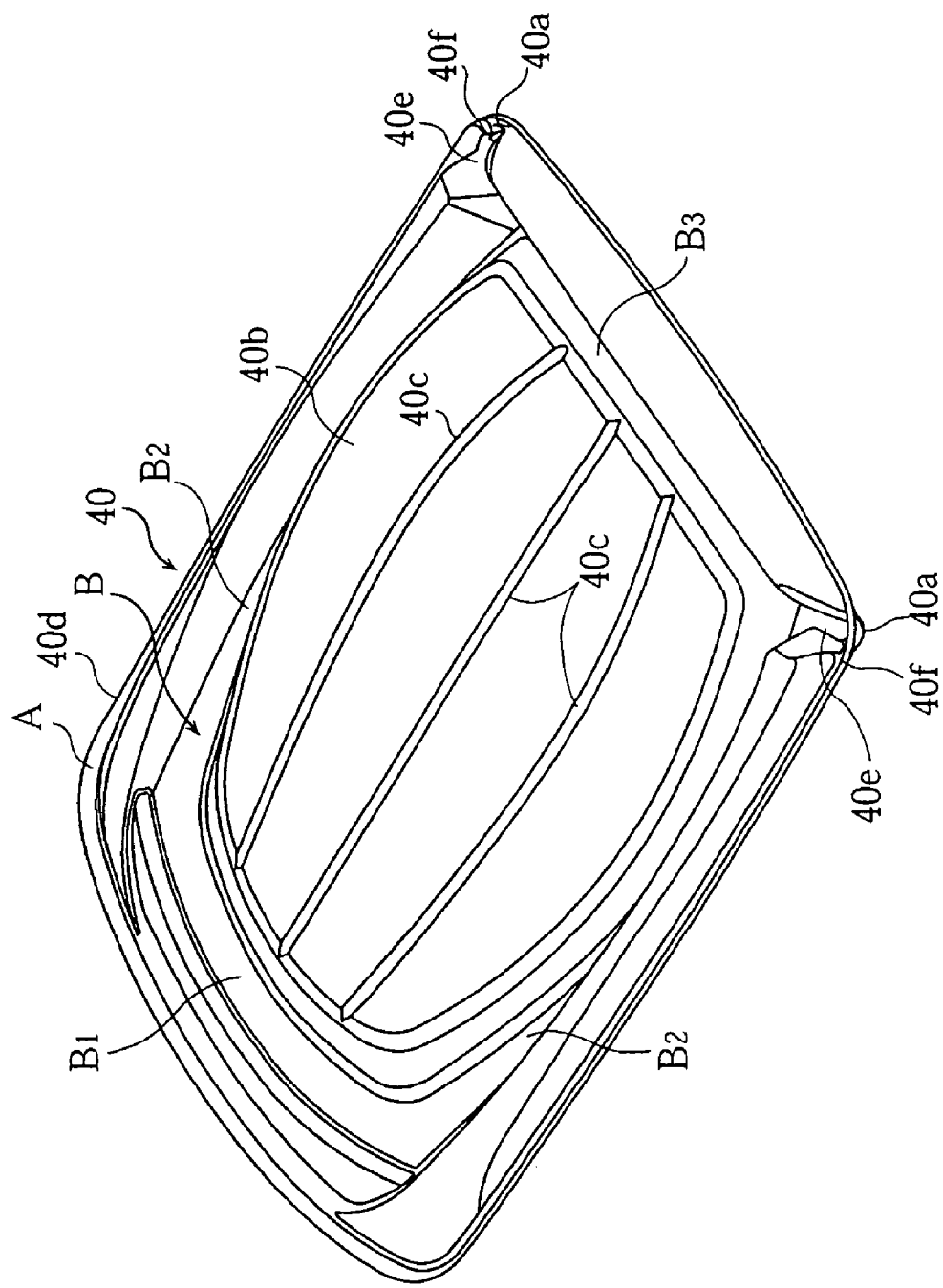
FIG. 18 is a perspective view of a roof disposed above the vehicle body frame.

On the driver seat side of the foot panel 8a, a recess portion 8d is arranged to recess downward. The recess portion 8d extends so as to reach an upper portion of the front panel portion 8b. In the recess portion 8d, pedal support portions 91b, 92b rotatably supporting an arm lower end portion (not shown) of an accelerator pedal 91 and an arm lower end portion 92a of a brake pedal 92 are arranged and accommodated, as shown in FIG. 15. To the brake pedal 92, a parking pedal 93 is coupled, and they are configured such that when the parking pedal 93 is pressed down in a state that the brake pedal 92 is pressed down, the parking brake is activated.

In the recessed portion 8d, a lid member 94 covering an upper end opening of the recess portion 8d is arranged. On an under surface of a front edge of this lid member 94, a claw portion 94a is provided, which engages with an engagement groove 8b' of the front panel portion 8b to be restricted in movement in the forward and backward direction. Further, on an under surface of the lid member 94, there are provided engagement ribs 94b extending along left and right sides and a rear opening edge of the recess portion.

Further, on the lid member 94, slits 94c, 94d each having a length extending backward from the front edge to reach a middle portion are formed. Through the respective slits 94c, 94d, the arm lower end portion of the accelerator pedal 91 and the arm lower end portion 92a of the brake pedal 92 are inserted, and the accelerator pedal 91 and the brake pedal 92 protrude upward of the lid member 94. Further, on an upper surface of the foot panel portion 8a, a mat 8a' preferably made of rubber is laid, which covers the foot panel 8a and the lid member 94, and on the mat 8a', there are formed cut-outs through which the arm lower end portions 92a of the respective pedals 91, 92 are inserted (refer to FIG. 8).

On the driver seat side of the front panel portion 8b, a steering opening 8f is formed. Through the steering opening 8f, the steering column 36 is inserted, and a space between the steering column 36 and the steering opening 8f is covered by a steering boot (not shown).

Further, on an upper edge portion of the front panel portion 8b, a lower edge portion 57e of the dashboard 57 is connected. On the upper edge portion, cut-out portions 8m are formed at intervals in the vehicle width direction. In the respective cut-out portions 8m, not-shown fastening members are inserted in a vertically movable manner, and by vertically moving the dashboard, an assembly error with respect to the front panel portion 8b is absorbed.

On a border portion between the foot panel portion 8a and the battery mounting portion 8c, there is formed an opening 8p through which the seat cross frame 16 is inserted. On a rear side of the opening 8p of the battery mounting portion 8c, a battery mounting recess portion 8q is arranged to recess downward. In the battery mounting recess portion 8q, a plurality (e.g., six pairs) of batteries (not shown) are arranged substantially parallel with each other in the vehicle width direction. This battery mounting recess portion 8q is arranged to be located below the seat cushion 24 and is covered by the rear cover 21.

In a bottom wall portion of the battery mounting recess portion 8q, a plurality (e.g., three) weep holes 8r opening downward are preferably formed. The weep holes 8r are formed at a middle portion in the vehicle width direction and left and right side portions, respectively. Further, in the bottom wall portion of the battery mounting recess portion 8q, middle, left and right guide trenches 8s, 8t are formed respectively, each having a trench depth that is set to incline downward to each weep hole 8r. The middle guide trench 8s is formed to intersect in an X-shape in a plan view, and the weep hole 8r is formed at this intersection. The left and right guide trenches 8t are each formed to spread outward in a V-shape in a plan view, and at a bending part of the V-shape, the weep hole 8r is formed.

In this preferred embodiment, the floor panel 8 has a structure such that the foot panel portion 8a on which an occupant places his/her feet and a front panel portion 8b extending obliquely upward between the legs of the occupant and the front suspension system 28 are integrally formed of resin, and it is arranged and fixed on the left and right main frames 10 of the vehicle body frame 2, so that the foot panel portion 8a and the front panel portion 8b can be assembled with the vehicle body frame 2 at the same time, which reduces the number of assembly steps as compared to the case in which the foot panel portion 8a and the front panel portion 8b are assembled individually with the vehicle body frame. Further, since the foot panel portion 8a and the front panel portion 8b are integrally formed of resin, a sealing property at a connecting portion therebetween does not have cause any problems. Furthermore, increases in cost are prevented as compared to the case that the both panel portions 8a, 8b are integrated by welding.

On the foot panel portion 8a, the recess portion 8d recessing downward is provided, and the recess portion 8d accommodates the pedal support portions 91b, 92b of the accelerator pedal 91 and the brake pedal 92. Therefore, it is possible to prevent the pedal support portions 91b, 92b from interfering with the feet of an occupant when the occupant presses down on the pedals 91, 92.

The upper end opening of the recess portion 8d is covered by the lid member 94, and the pedal support portions 91b, 92b are covered and hidden therein, so that the interference of the feet of an occupant with the pedal support portions 91b, 92b are reliably prevented, and also the deterioration in appearance can be prevented. Further, by simply removing the lid member 94, maintenance of the pedal support portions 91b, 92b can be easily performed.

On the rear edge of the foot panel portion 8a, the battery mounting portion 8c located below the seat cushion 24 is integrally formed, so that a vacant space under the seat cushion can be effectively utilized to accommodate battery units. Further, since the battery mounting portion 8c and the foot panel portion 8a are integrally formed of resin, increases in cost can be prevented as compared to the case that the both portions are formed separately and are defined by completely independent bodies.

On the battery mounting portion 8c, there are formed a plurality (e.g., three) weep holes 8r opening downward and the guide trenches 8s, 8t each having the trench depth that is set to incline downward to each weep hole 8r, so that the water flowing into the battery mounting portion 8c passes the respective guide trenches 8s, 8t and discharged downward through the weep holes 8r. Thus, in case a battery liquid is spilt when the battery liquid is refilled or water enters the battery mounting portion 8c while washing the vehicle, the battery liquid or water does not remain inside the battery mounting portion 8c.

On the under surface of the foot panel portion 8a and the battery mounting portion 8c, the cut-outs 8j'" are formed, which engage with both side surfaces of the left and right main frames 10 to restrict the position of the floor panel 8 in the vehicle width direction, so that positioning for assembling the floor panel 8 with the vehicle body frame 2 can be easily performed, and the precision of assembly of the floor panel 8 with respect to the vehicle body frame 2 can be increased.

The opening 8f is formed on the front panel portion 8b through which the steering column 36 is inserted, so that the steering column 36 can be easily assembled via the opening 8f.

On the upper edge portion of the front panel portion 8b, the lower edge of the dashboard 57 is arranged and connected, so that the precision of assembly of the dashboard 57 with the front panel portion 8b can be increased, and its appearance can be improved.

In this preferred embodiment, on the rear portions 10c of the left and right main frames 10, the front-side and rear-side rear cross frames 17, 18 are connected, and the front-side and rear-side rear cross frames 17, 18 each preferably have a Π shape extending up from the main frames 10, so that the stiffness of a rear portion of the vehicle body frame 2 can be increased, and the space between the left and right main frames 10 can be made larger.

Below the rear-side rear cross frame 18, the rear wheel shaft unit 4a is arranged, and between the rear wheel shaft unit 4a and the rear-side rear cross frame 18, the damper units 49 are interposed, so that the damper unit 49 can be supported by the rear-side rear cross frame 18 having high stiffness. As a result, the stiffness against an impact from the road surface can be assured.

In this preferred embodiment, the leaf springs 48 are pivotally supported by the rear portions 10c bending upward from the left and right main frames 10, and the rear wheel shaft unit 4a is fixed by the leaf springs 48, so that the leaf springs 48 can be supported by the rear portions 10c having high stiffness.

When seen from the side of the vehicle, a triangle is defined by the main frames 10, the support posts 31, and the front panel portion 8b fixed to the front pipes 33, the stiffness in attachment of the front panel portion 8b with the vehicle body frame 2 can be assured. Thus, the lower end portion of the front pipes 33 can be free, and the vehicle weight can be decreased accordingly.

By the front and rear suspension brackets 30a, 30b joined to each front portion 10a of the left and right main frames 10, the front and rear base portions 73a, 73b of the arm 73 having a fork shape of the front suspension system are supported in a vertically swingable manner, and the cushion unit 76 is interposed between the upper end portion 30b" of the rear suspension bracket 30b and the arm 73, so that two members, the rear base portion 73b of the arm 73 and the upper end of the cushion unit 76, can be pivotally supported by one rear suspension bracket 30b, thereby enabling reduction in the number of parts and simplification in the structure.

In this preferred embodiment, the first rain gutter A is preferably provided on the outer peripheral portion of the roof 4 and the second rain gutter B preferably has substantially annular shape by recessing the portion inside the first rain gutter A, and the first rain gutter A is communicating with the drain passages 40e for draining water pooled inside the first rain gutter A downward to the outside of the roof, so that dripping of rainwater can be prevented over the entire circumference of the roof 40. Therefore, obstruction in the view by the rainwater or wetting of a golf bag can be prevented.

On the left and right rear end portions of the roof 40, the drain holes 40a for draining the water pooled inside the first and second rain gutters A, B are arranged to extend downward to the outside of the roof. The drain hoses 85 are connected to the drain holes 40a, and the lower end openings of the drain hoses 85 are located lower than the seat cushion 24, so that the dripping of rainwater can be prevented more securely over the entire circumference of the roof 40.

The roof area b1 surrounded by the second rain gutter B is preferably larger than the outside roof area a1 surrounded by the first and second rain gutters A, B, so that the efficiency in drainage of rainwater falling on the roof 40 can be enhanced.

The passage cross-sectional area b2 of the second rain gutter B is preferably larger than the passage cross-sectional area a2 of the first rain gutter A, so that the efficiency in drainage of rainwater falling on the roof 40 can be increased.

The present invention may be embodied in other specific forms without departing from the spirit or essential characteristics thereof.

The present preferred embodiments are therefore to be considered in all respects as illustrative and non-restrictive, the scope of the invention being indicated by the appended claims rather than by the foregoing description, and all changes which fall within the meaning and range of equivalency of the claims are therefore intended to be embraced therein.

What is claimed is:

1. A small-sized vehicle, comprising:
a vehicle body frame;
a suspension system supporting front wheels arranged at the left and right sides of a front portion of said vehicle body frame on said vehicle body frame;
a steering system arranged to steer the front wheels;
a seat unit mounted on said vehicle body frame;
a floor panel arranged on said vehicle body frame; and
a lid member arranged to cover an upper end opening of a recess portion in a detachably fixed manner, wherein in said lid member, cut-outs through which an accelerator pedal arm and a brake pedal arm are inserted are provided; wherein
said floor panel includes a foot panel portion on which an occupant sitting on said seat unit places his/her feet and a front panel portion arranged to extend upwardly between said suspension system and legs of the occupant, said foot panel portion and said front panel portion being defined by a single unitary resin member;
said resin floor panel is arranged and fixed on said vehicle body frame; and
the recess portion recessing downward is formed in said foot panel portion, and in the recess portion, pedal support portions rotatably supporting an arm lower end portion of the accelerator pedal and an arm lower end portion of the brake pedal are provided.

2. The small-sized vehicle according to claim 1, further comprising an item placement panel portion that is integral with a rear edge of said foot panel portion, and said item placement panel portion is located below said seat unit.

3. The small-sized vehicle according to claim 2, wherein said item placement panel portion is a battery mounting portion for mounting batteries, and in the battery mounting portion, a weep hole opening downward and a guide trench having a depth that inclines downward to the weep hole are provided.

4. The small-sized vehicle according to claim 1, wherein on an under surface of said foot panel portion of said floor panel, positioning portions engaging with frame members extending in a forward and backward direction of the vehicle body frame so as to restrict a position of said floor panel in the vehicle width direction are integrally arranged.

5. The small-sized vehicle according to claim 1, wherein a cut-out or opening through which a steering column is inserted is formed in said front panel portion.

6. The small-sized vehicle according to claim 5, wherein a dashboard is arranged and connected to an upper portion of said front panel portion.

* * * * *